(12) United States Patent
Chen et al.

(10) Patent No.: US 10,798,031 B1
(45) Date of Patent: Oct. 6, 2020

(54) GENERIC DISAMBIGUATION

(71) Applicant: MOVEWORKS, INC., Mountain View, CA (US)

(72) Inventors: Jing Chen, Redwood City, CA (US); Chang Liu, Mountain View, CA (US); Ye Wang, Santa Clara, CA (US); Jiang Chen, Fremont, CA (US)

(73) Assignee: MOVEWORKS, INC., Mountain View, CA (US)

( * ) Notice: Subject to any disclaimer, the term of this patent is extended or adjusted under 35 U.S.C. 154(b) by 0 days.

(21) Appl. No.: 16/847,419

(22) Filed: Apr. 13, 2020

(51) Int. Cl.
*H04L 12/58* (2006.01)
*G06F 40/35* (2020.01)
*G06F 40/289* (2020.01)
*G06F 40/56* (2020.01)

(52) U.S. Cl.
CPC .......... *H04L 51/02* (2013.01); *G06F 40/289* (2020.01); *G06F 40/35* (2020.01); *G06F 40/56* (2020.01)

(58) Field of Classification Search
CPC .......... H04L 51/00–51/38; G06F 40/00–40/58
See application file for complete search history.

(56) References Cited

U.S. PATENT DOCUMENTS

| 7,505,892 B2 | 3/2009 | Foderaro |
| 8,566,102 B1* | 10/2013 | Bangalore .............. G10L 15/22 704/270.1 |
| 9,009,046 B1 | 4/2015 | Stewart |
| 9,465,833 B2 | 10/2016 | Aravamudan et al. |
| 9,647,968 B2 | 5/2017 | Smullen et al. |
| 9,794,199 B2 | 10/2017 | Capper |
| 9,836,452 B2 | 12/2017 | Robichaud et al. |
| 9,947,319 B1 | 4/2018 | Horling |
| 2006/0069546 A1* | 3/2006 | Rosser .................... G10L 13/00 704/9 |

(Continued)

OTHER PUBLICATIONS

"What's disambiguation?", Conversation Builder—Disambiguation Dialogs | LivePerson Developers, https://developers.liveperson.com/conversation-builder-dialogs-disambiguation-dialogs.html, retrieved Dec. 17, 2019, 5 pages.

(Continued)

*Primary Examiner* — Clayton R Williams
(74) *Attorney, Agent, or Firm* — Ascenda Law Group, PC

(57) ABSTRACT

A disambiguation dialog may be generated by determining candidate responses based on an intent of a user's message. A utility value and a relevance probability may be determined for each of the candidate responses. An intermediate ranking may be computed for each of the candidate responses based on the utility value and the relevance probability. Candidate dialogs may be formed with the top candidate response, the top two candidate responses, and so on. Additional candidate dialogs may be generated by varying a presentation format of the candidate responses. Discoverability probabilities may be associated with each of the candidate responses within a candidate dialog. A joint metric for each candidate dialog may be computed as a function of the utility value, relevance probability and discoverability probability associated with each of the candidate responses included in the candidate dialog. The highest ranked candidate dialog may be selected as the disambiguation dialog.

20 Claims, 27 Drawing Sheets

(56) References Cited

U.S. PATENT DOCUMENTS

2009/0089044 A1* 4/2009 Cooper .................. G06F 40/30
704/9
2012/0260263 A1 10/2012 Edoja
2017/0243107 A1 8/2017 Jolley et al.
2018/0075847 A1 3/2018 Lee

OTHER PUBLICATIONS

"How the dialog is processed", IBM Cloud Docs / Watson Assistant, https://cloud.ibm.com/docs/services/assistant?topic=assistant-dialog-runtime, last updated: Nov. 26, 2019, 47 pages.
Phillips, Casey, "Why Disambiguation is a Chatbot's Most Powerful Weapon", Chatbots Life Newsletter, chatbotslife.com (Apr. 9, 2019), https://chatbotslife.com/why-disambiguation-is-a-chatbots-most-powerful-weapon-7723ef471a36, 8 pages.

* cited by examiner

Alice 11:03 PM
I'm having some problems with the printer

108

| All Skills | Selected Skills | Candidate Response ID | Utility Value |
|---|---|---|---|
| Search | Search | R1 | 0.5 |
| Form Filling | Form filling | R2 | 0.1 |
| | | R3 | 0.8 |
| | | R4 | 0.8 |
| | | R5 | 0.8 |
| Help Desk | Help Desk | R6 | 0.8 |
| Customer Support | Customer Support | R7 | 0.1 |
| Weather | | | |
| News | | | |

Fig. 5

| Candidate Response ID | Presentation Format | Candidate Response |
|---|---|---|
| R1 | long | Common troubleshooting tips for a printer include: 1) check for paper jams; 2) check connection between computer and printer; 3) check toner level; 4) check paper level |
| | medium | troubleshooting tips. Common troubleshooting tips for a printer include: ... |
| | short | Click link to view printer troubleshooting tips |
| R2 | long | Place order for a new printer. A bot will walk you through the steps of selecting the make, model number of the new printer and will contact management to obtain authorization if the purchase exceeds $1000. |
| | medium | Place order for a new printer. A bot will help you place the purchase order. |
| | short | Order a new printer that is identical to the one you currently have |
| R3 | long | Send technician to service printer (24 hour response time). A bot will walk you through a process to input the make, model number of the printer and arrange an appointment window. |
| | medium | Send technician to service printer (24 hour response time) |
| | short | Send technician to service printer |
| R4 | long | Hmmm... maybe your printer just ran out of paper. Would you like me to order paper for you? If so, how may reams of paper would you like me to order? |
| | medium | Hmmm... maybe your printer just ran out of paper. Would you like to order some paper? |
| | short | Order paper |
| R5 | long | Hmmm... maybe your printer just ran out of toner. Would you like me to order a toner cartridge for you? If so, how may cartridges would you like me to order? |
| | medium | Hmmm... maybe your printer just ran out of toner. Would you like to order a toner cartridge? |
| | short | Order toner |

Fig. 6A

| Candidate Response ID | Presentation Format | Candidate Response |
|---|---|---|
| R6 | long | In a few quick and easy steps, you can be connected with IT Support. Did you want to connect with IT Support through chat, video conference or a telephone call? |
| | medium | In a few quick and easy steps, you can be connected with IT Support |
| | short | Contact IT support |
| R7 | long | If you provide me with the make of the printer, I can find the customer support number of the manufacturer of the printer. Sounds good? |
| | medium | Did you want to speak with the customer support from the manufacture of the printer? |
| | short | Call manufacturer of printer |

Fig. 6B

| Selected Skills | Candidate Response ID | Utility Value | Relevance Probability |
|---|---|---|---|
| Search | R1 | 0.5 | 0.18 |
| Form filling | R2 | 0.1 | 0.15 |
| | R3 | 0.7 | 0.18 |
| | R4 | 0.8 | 0.05 |
| | R5 | 0.8 | 0.07 |
| Help Desk | R6 | 0.8 | 0.18 |
| Customer Support | R7 | 0.1 | 0.19 |

Fig. 7

| Selected Skills | Candidate Response ID | Utility Value | Relevance Probability | Intermediate Ranking |
|---|---|---|---|---|
| Help Desk | R6 | 0.8 | 0.18 | 0.144 |
| Form Filling | R3 | 0.7 | 0.18 | 0.126 |
| Search | R1 | 0.5 | 0.18 | 0.090 |
| Form Filling | R5 | 0.8 | 0.07 | 0.056 |
| Form Filling | R4 | 0.8 | 0.05 | 0.040 |
| Customer Support | R7 | 0.1 | 0.19 | 0.019 |
| Form Filling | R2 | 0.1 | 0.15 | 0.015 |

Fig. 8

| Candidate Dialog | Candidate Response | Presentation Format | Utility Value | Relevance Probability | Discoverability Probability | Joint Metric |
|---|---|---|---|---|---|---|
| 1 | R6 | Long | 0.8 | 0.18 | 0.80 | 0.1152 |
| 2 | R6 | Medium | 0.8 | 0.18 | 0.90 | 0.1296 |
| 3 | R6 | Short | 0.8 | 0.18 | 1.00 | 0.1440 |
| 4 | R6 | Long | 0.8 | 0.18 | 0.50 | 0.1098 |
|  | R3 | Long | 0.7 | 0.18 | 0.30 |  |
| 5 | R6 | Long | 0.8 | 0.18 | 0.50 | 0.0972 |
|  | R3 | Medium | 0.7 | 0.18 | 0.20 |  |
| 6 | R6 | Long | 0.8 | 0.18 | 0.50 | 0.0846 |
|  | R3 | Short | 0.7 | 0.18 | 0.10 |  |
| 7 | R6 | Medium | 0.8 | 0.18 | 0.50 | 0.1350 |
|  | R3 | Long | 0.7 | 0.18 | 0.50 |  |
| 8 | R6 | Medium | 0.8 | 0.18 | 0.50 | 0.1224 |
|  | R3 | Medium | 0.7 | 0.18 | 0.40 |  |
| 9 | R6 | Medium | 0.8 | 0.18 | 0.50 | 0.1098 |
|  | R3 | Short | 0.7 | 0.18 | 0.30 |  |
| 10 | R6 | Short | 0.8 | 0.18 | 0.50 | 0.1098 |
|  | R3 | Long | 0.7 | 0.18 | 0.30 |  |
| 11 | R6 | Short | 0.8 | 0.18 | 0.50 | 0.1224 |
|  | R3 | Medium | 0.7 | 0.18 | 0.40 |  |
| 12 | R6 | Short | 0.8 | 0.18 | 0.50 | 0.1350 |
|  | R3 | Short | 0.7 | 0.18 | 0.50 |  |
| 13 | R6 | Long | 0.8 | 0.18 | 0.30 | 0.0774 |
|  | R3 | Long | 0.7 | 0.18 | 0.20 |  |
|  | R1 | Long | 0.5 | 0.18 | 0.10 |  |
| 14 | R6 | Long | 0.8 | 0.18 | 0.30 | 0.0729 |
|  | R3 | Long | 0.7 | 0.18 | 0.20 |  |
|  | R1 | Medium | 0.5 | 0.18 | 0.05 |  |
| 15 | R6 | Long | 0.8 | 0.18 | 0.30 | 0.0702 |
|  | R3 | Long | 0.7 | 0.18 | 0.20 |  |
|  | R1 | Short | 0.5 | 0.18 | 0.02 |  |

Fig. 9A

| Candidate Dialog | Candidate Response ID | Presentation Format | Utility Value | Relevance Probability | Discoverability Probability | Joint Metric |
|---|---|---|---|---|---|---|
| 16 | R6 | Long | 0.8 | 0.18 | 0.30 | 0.0648 |
| | R3 | Medium | 0.7 | 0.18 | 0.10 | |
| | R1 | Long | 0.5 | 0.18 | 0.10 | |
| 17 | R6 | Long | 0.8 | 0.18 | 0.40 | 0.1008 |
| | R3 | Medium | 0.7 | 0.18 | 0.20 | |
| | R1 | Medium | 0.5 | 0.18 | 0.20 | |
| 18 | R6 | Long | 0.8 | 0.18 | 0.50 | 0.1188 |
| | R3 | Medium | 0.7 | 0.18 | 0.30 | |
| | R1 | Short | 0.5 | 0.18 | 0.10 | |
| 19 | R6 | Long | 0.8 | 0.18 | 0.40 | 0.0882 |
| | R3 | Short | 0.7 | 0.18 | 0.10 | |
| | R1 | Long | 0.5 | 0.18 | 0.20 | |
| 20 | R6 | Long | 0.8 | 0.18 | 0.50 | 0.1116 |
| | R3 | Short | 0.7 | 0.18 | 0.10 | |
| | R1 | Medium | 0.5 | 0.18 | 0.30 | |
| 21 | R6 | Long | 0.8 | 0.18 | 0.70 | 0.1548 |
| | R3 | Short | 0.7 | 0.18 | 0.25 | |
| | R1 | Short | 0.5 | 0.18 | 0.25 | |
| 22 | R6 | Medium | 0.8 | 0.18 | 0.40 | 0.1026 |
| | R3 | Long | 0.7 | 0.18 | 0.25 | |
| | R1 | Long | 0.5 | 0.18 | 0.15 | |
| 23 | R6 | Medium | 0.8 | 0.18 | 0.50 | 0.1710 |
| | R3 | Long | 0.7 | 0.18 | 0.50 | |
| | R1 | Medium | 0.5 | 0.18 | 0.40 | |
| 24 | R6 | Medium | 0.8 | 0.18 | 0.40 | 0.1350 |
| | R3 | Long | 0.7 | 0.18 | 0.40 | |
| | R1 | Short | 0.5 | 0.18 | 0.30 | |
| 25 | R6 | Medium | 0.8 | 0.18 | 0.30 | 0.0864 |
| | R3 | Medium | 0.7 | 0.18 | 0.20 | |
| | R1 | Long | 0.5 | 0.18 | 0.20 | |
| 26 | R6 | Medium | 0.8 | 0.18 | 0.30 | 0.1080 |
| | R3 | Medium | 0.7 | 0.18 | 0.30 | |
| | R1 | Medium | 0.5 | 0.18 | 0.30 | |
| 27 | R6 | Medium | 0.8 | 0.18 | 0.30 | 0.0990 |
| | R3 | Medium | 0.7 | 0.18 | 0.30 | |
| | R1 | Short | 0.5 | 0.18 | 0.20 | |

Fig. 9B

| Candidate Dialog | Candidate Response | Presentation Format | Utility Value | Relevance Probability | Discoverability Probability | Joint Metric |
|---|---|---|---|---|---|---|
| 28 | R6 | Medium | 0.8 | 0.18 | 0.30 | 0.0738 |
|  | R3 | Short | 0.7 | 0.18 | 0.10 |  |
|  | R1 | Long | 0.5 | 0.18 | 0.20 |  |
| 29 | R6 | Medium | 0.8 | 0.18 | 0.30 | 0.0972 |
|  | R3 | Short | 0.7 | 0.18 | 0.25 |  |
|  | R1 | Medium | 0.5 | 0.18 | 0.25 |  |
| 30 | R6 | Medium | 0.8 | 0.18 | 0.40 | 0.1224 |
|  | R3 | Short | 0.7 | 0.18 | 0.30 |  |
|  | R1 | Short | 0.5 | 0.18 | 0.30 |  |
| 31 | R6 | Short | 0.8 | 0.18 | 0.30 | 0.1206 |
|  | R3 | Long | 0.7 | 0.18 | 0.40 |  |
|  | R1 | Long | 0.5 | 0.18 | 0.30 |  |
| 32 | R6 | Short | 0.8 | 0.18 | 0.30 | 0.1368 |
|  | R3 | Long | 0.7 | 0.18 | 0.60 |  |
|  | R1 | Short | 0.5 | 0.18 | 0.20 |  |
| 33 | R6 | Long | 0.8 | 0.18 | 0.40 | 0.1044 |
|  | R3 | Long | 0.7 | 0.18 | 0.30 |  |
|  | R1 | Short | 0.5 | 0.18 | 0.10 |  |
| 34 | R6 | Long | 0.8 | 0.18 | 0.35 | 0.0891 |
|  | R3 | Short | 0.7 | 0.18 | 0.20 |  |
|  | R1 | Long | 0.5 | 0.18 | 0.15 |  |
| 35 | R6 | Short | 0.8 | 0.18 | 0.30 | 0.0990 |
|  | R3 | Medium | 0.7 | 0.18 | 0.30 |  |
|  | R1 | Medium | 0.5 | 0.18 | 0.20 |  |
| 36 | R6 | Short | 0.8 | 0.18 | 0.50 | 0.1620 |
|  | R3 | Medium | 0.7 | 0.18 | 0.50 |  |
|  | R1 | Short | 0.5 | 0.18 | 0.30 |  |
| 37 | R6 | Short | 0.8 | 0.18 | 0.30 | 0.1197 |
|  | R3 | Short | 0.7 | 0.18 | 0.25 |  |
|  | R1 | Long | 0.5 | 0.18 | 0.50 |  |
| 38 | R6 | Short | 0.8 | 0.18 | 0.40 | 0.1269 |
|  | R3 | Short | 0.7 | 0.18 | 0.30 |  |
|  | R1 | Medium | 0.5 | 0.18 | 0.35 |  |
| 39 | R6 | Short | 0.8 | 0.18 | 0.30 | 0.0927 |
|  | R3 | Short | 0.7 | 0.18 | 0.25 |  |
|  | R1 | Short | 0.5 | 0.18 | 0.20 |  |

Fig. 9C

Alice 11:03 PM
I'm having some problems with the printer  ← 108
Bot 11:03 PM
Here are some options:
1. In a few quick and easy steps, you can be connected with IT  ← 126
   Support. Did you want to connect with IT Support through chat,
   video conference or a telephone call?
2. Send technician to service printer
3. Click link to view printer troubleshooting tips
Fig. 10

Alice 11:03 PM — 108
I'm having some problems with the printer

Bot 11:03 PM
Here are some options:

1. In a few quick and easy steps, you can be connected with IT Support. Did you want to connect with IT Support through chat, video conference or a telephone call? — 126

2. Send technician to service printer

3. Click link to view printer troubleshooting tips

Alice 11:05 PM — 128
Great! Please send a technician

Bot 11:05 PM — 138
Ok, the technician will drop by tomorrow around 3 PM. Did you need anything else?

Alice 11:10 PM — 140
I'm good. Thanks!

Fig. 11A

| Selected Skills | Candidate Response ID | Utility Value | Relevance Probability | Intermediate Ranking |
|---|---|---|---|---|
| Search | R1 | 0.5 | 0.179 | 0.0895 |
| Form filling | R2 | 0.1 | 0.149 | 0.0149 |
|  | R3 | 0.7 | 0.186 | 0.1302 |
|  | R4 | 0.8 | 0.049 | 0.0392 |
|  | R5 | 0.8 | 0.069 | 0.0552 |
| Help Desk | R6 | 0.8 | 0.179 | 0.1432 |
| Customer Support | R7 | 0.1 | 0.189 | 0.0189 |

Fig. 11B

 Alice 11:03 PM
I'm having some problems with the printer     108
 Bot 11:03 PM
Here are some options:
126
1. In a few quick and easy steps, you can be connected with IT Support. Did you want to connect with IT Support through chat, video conference or a telephone call?
2. Send technician to service printer
3. Click link to view printer troubleshooting tips
(Alice drops off from conversation...)
Fig. 12A

| Candidate Dialog | Candidate Response | Verbosity Level | Utility Value | Relevance Probability | Discoverability Probability | Joint Metric |
|---|---|---|---|---|---|---|
| 1 | R6 | Long | 0.8 | 0.18 | 0.80 | 0.1152 |
| 2 | R6 | Medium | 0.8 | 0.18 | 0.90 | 0.1296 |
| 3 | R6 | Short | 0.8 | 0.18 | 1.00 | 0.144 |
| 4 | R6 | Long | 0.8 | 0.18 | 0.50 | 0.1098 |
|   | R3 | Long | 0.7 | 0.18 | 0.30 |   |
| 5 | R6 | Long | 0.8 | 0.18 | 0.50 | 0.0972 |
|   | R3 | Medium | 0.7 | 0.18 | 0.20 |   |
| 6 | R6 | Long | 0.8 | 0.18 | 0.50 | 0.0846 |
|   | R3 | Short | 0.7 | 0.18 | 0.10 |   |
| 7 | R6 | Medium | 0.8 | 0.18 | 0.50 | 0.1350 |
|   | R3 | Long | 0.7 | 0.18 | 0.50 |   |
| 8 | R6 | Medium | 0.8 | 0.18 | 0.50 | 0.1224 |
|   | R3 | Medium | 0.7 | 0.18 | 0.40 |   |
| 9 | R6 | Medium | 0.8 | 0.18 | 0.50 | 0.1098 |
|   | R3 | Short | 0.7 | 0.18 | 0.30 |   |
| 10 | R6 | Short | 0.8 | 0.18 | 0.50 | 0.1098 |
|   | R3 | Long | 0.7 | 0.18 | 0.30 |   |
| 11 | R6 | Short | 0.8 | 0.18 | 0.50 | 0.1224 |
|   | R3 | Medium | 0.7 | 0.18 | 0.40 |   |
| 12 | R6 | Short | 0.8 | 0.18 | 0.50 | 0.1350 |
|   | R3 | Short | 0.7 | 0.18 | 0.50 |   |
| 13 | R6 | Long | 0.8 | 0.18 | 0.30 | 0.0774 |
|   | R3 | Long | 0.7 | 0.18 | 0.20 |   |
|   | R1 | Long | 0.5 | 0.18 | 0.10 |   |
| 14 | R6 | Long | 0.8 | 0.18 | 0.30 | 0.0729 |
|   | R3 | Long | 0.7 | 0.18 | 0.20 |   |
|   | R1 | Medium | 0.5 | 0.18 | 0.05 |   |
| 15 | R6 | Long | 0.8 | 0.18 | 0.30 | 0.0702 |
|   | R3 | Long | 0.7 | 0.18 | 0.20 |   |
|   | R1 | Short | 0.5 | 0.18 | 0.02 |   |

Fig. 12B

| Candidate Dialog | Candidate Response ID | Verbosity Level | Utility Value | Relevance Probability | Discoverability Probability | Joint Metric |
|---|---|---|---|---|---|---|
| 16 | R6 | Long | 0.8 | 0.18 | 0.30 | 0.0648 |
|  | R3 | Medium | 0.7 | 0.18 | 0.10 |  |
|  | R1 | Long | 0.5 | 0.18 | 0.10 |  |
| 17 | R6 | Long | 0.8 | 0.18 | 0.40 | 0.1008 |
|  | R3 | Medium | 0.7 | 0.18 | 0.20 |  |
|  | R1 | Medium | 0.5 | 0.18 | 0.20 |  |
| 18 | R6 | Long | 0.8 | 0.18 | 0.50 | 0.1188 |
|  | R3 | Medium | 0.7 | 0.18 | 0.30 |  |
|  | R1 | Short | 0.5 | 0.18 | 0.10 |  |
| 19 | R6 | Long | 0.8 | 0.18 | 0.40 | 0.0882 |
|  | R3 | Short | 0.7 | 0.18 | 0.10 |  |
|  | R1 | Long | 0.5 | 0.18 | 0.20 |  |
| 20 | R6 | Long | 0.8 | 0.18 | 0.50 | 0.1116 |
|  | R3 | Short | 0.7 | 0.18 | 0.10 |  |
|  | R1 | Medium | 0.5 | 0.18 | 0.30 |  |
| 21 | R6 | Long | 0.8 | 0.18 | 0.65 | 0.1368 |
|  | R3 | Short | 0.7 | 0.18 | 0.20 |  |
|  | R1 | Short | 0.5 | 0.18 | 0.20 |  |
| 22 | R6 | Medium | 0.8 | 0.18 | 0.40 | 0.1026 |
|  | R3 | Long | 0.7 | 0.18 | 0.25 |  |
|  | R1 | Long | 0.5 | 0.18 | 0.15 |  |
| 23 | R6 | Medium | 0.8 | 0.18 | 0.50 | 0.1710 |
|  | R3 | Long | 0.7 | 0.18 | 0.50 |  |
|  | R1 | Medium | 0.5 | 0.18 | 0.40 |  |
| 24 | R6 | Medium | 0.8 | 0.18 | 0.40 | 0.1350 |
|  | R3 | Long | 0.7 | 0.18 | 0.40 |  |
|  | R1 | Short | 0.5 | 0.18 | 0.30 |  |
| 25 | R6 | Medium | 0.8 | 0.18 | 0.30 | 0.0864 |
|  | R3 | Medium | 0.7 | 0.18 | 0.20 |  |
|  | R1 | Long | 0.5 | 0.18 | 0.20 |  |
| 26 | R6 | Medium | 0.8 | 0.18 | 0.30 | 0.1080 |
|  | R3 | Medium | 0.7 | 0.18 | 0.30 |  |
|  | R1 | Medium | 0.5 | 0.18 | 0.30 |  |
| 27 | R6 | Medium | 0.8 | 0.18 | 0.30 | 0.0990 |
|  | R3 | Medium | 0.7 | 0.18 | 0.30 |  |
|  | R1 | Short | 0.5 | 0.18 | 0.20 |  |

Fig. 12C

| Candidate Dialog | Candidate Response | Verbosity Level | Utility Value | Relevance Probability | Discoverability Probability | Joint Metric |
|---|---|---|---|---|---|---|
| 28 | R6 | Medium | 0.8 | 0.18 | 0.30 | 0.0738 |
| | R3 | Short | 0.7 | 0.18 | 0.10 | |
| | R1 | Long | 0.5 | 0.18 | 0.20 | |
| 29 | R6 | Medium | 0.8 | 0.18 | 0.30 | 0.0972 |
| | R3 | Short | 0.7 | 0.18 | 0.25 | |
| | R1 | Medium | 0.5 | 0.18 | 0.25 | |
| 30 | R6 | Medium | 0.8 | 0.18 | 0.40 | 0.1224 |
| | R3 | Short | 0.7 | 0.18 | 0.30 | |
| | R1 | Short | 0.5 | 0.18 | 0.30 | |
| 31 | R6 | Short | 0.8 | 0.18 | 0.30 | 0.1206 |
| | R3 | Long | 0.7 | 0.18 | 0.40 | |
| | R1 | Long | 0.5 | 0.18 | 0.30 | |
| 32 | R6 | Short | 0.8 | 0.18 | 0.30 | 0.1368 |
| | R3 | Long | 0.7 | 0.18 | 0.60 | |
| | R1 | Short | 0.5 | 0.18 | 0.20 | |
| 33 | R6 | Long | 0.8 | 0.18 | 0.40 | 0.1044 |
| | R3 | Long | 0.7 | 0.18 | 0.30 | |
| | R1 | Short | 0.5 | 0.18 | 0.10 | |
| 34 | R6 | Long | 0.8 | 0.18 | 0.35 | 0.0891 |
| | R3 | Short | 0.7 | 0.18 | 0.20 | |
| | R1 | Long | 0.5 | 0.18 | 0.15 | |
| 35 | R6 | Short | 0.8 | 0.18 | 0.30 | 0.0990 |
| | R3 | Medium | 0.7 | 0.18 | 0.30 | |
| | R1 | Medium | 0.5 | 0.18 | 0.20 | |
| 36 | R6 | Short | 0.8 | 0.18 | 0.50 | 0.1620 |
| | R3 | Medium | 0.7 | 0.18 | 0.50 | |
| | R1 | Short | 0.5 | 0.18 | 0.30 | |
| 37 | R6 | Short | 0.8 | 0.18 | 0.30 | 0.1197 |
| | R3 | Short | 0.7 | 0.18 | 0.25 | |
| | R1 | Long | 0.5 | 0.18 | 0.50 | |
| 38 | R6 | Short | 0.8 | 0.18 | 0.40 | 0.1269 |
| | R3 | Short | 0.7 | 0.18 | 0.30 | |
| | R1 | Medium | 0.5 | 0.18 | 0.35 | |
| 39 | R6 | Short | 0.8 | 0.18 | 0.30 | 0.0927 |
| | R3 | Short | 0.7 | 0.18 | 0.25 | |
| | R1 | Short | 0.5 | 0.18 | 0.20 | |

Fig. 12D

Alice 11:03 PM — 108
I'm having some problems with the printer

Bot 11:03 PM
Here are some options:

1. In a few quick and easy steps, you can be connected with IT Support. Did you want to connect with IT Support through chat, video conference or a telephone call? — 126

2. Send technician to service printer

3. Click link to view printer troubleshooting tips

Alice 11:05 PM — 128
You know what, it looks like the printer just ran out of paper. Oh no, looks like the printer room is out of paper. Can you order some paper and request 2-day shipping for the order?

Bot 11:05 PM — 142
Done. Paper has been ordered with 2-day shipping. Your confirmation number is XYZ123.

Alice 11:06 PM — 144
Thanks!

Fig. 13A

| Selected Skills | Candidate Response ID | Utility Value | Relevance Probability | Intermediate Ranking |
|---|---|---|---|---|
| Help Desk | R6 | 0.8 | 0.179 | 0.1432 |
| Form Filling | R3 | 0.7 | 0.179 | 0.1253 |
| Search | R1 | 0.5 | 0.179 | 0.0895 |
| Form Filling | R5 | 0.8 | 0.069 | 0.0552 |
| Form Filling | R4 | 0.8 | 0.056 | 0.0448 |
| Customer Support | R7 | 0.1 | 0.189 | 0.0189 |
| Form Filling | R2 | 0.1 | 0.149 | 0.0149 |

Fig. 13B

GENERIC DISAMBIGUATION

FIELD OF THE INVENTION

The present invention relates to the generation of a disambiguation dialog in response to a message from a user, and more particularly relates to the evaluation of candidate dialogs in accordance with a metric and selecting an optimal disambiguation dialog based on the computed metrics.

BACKGROUND

In a conversation between a user and an automated agent, the optimal response to the user's message may not always be clear. In such instances, a disambiguation dialog may be generated by an automated agent and presented to the user. The disambiguation dialog may include a plurality of possible responses to the user's message. Following the user's selection of one of the possible responses in the disambiguation dialog, the conversation with the automated agent may proceed in accordance with the selected response.

A user, however, may face certain challenges when presented with a disambiguation dialog. If the disambiguation dialog includes too few choices, it is possible that the disambiguation dialog does not contain the choice that user is looking for. Alternatively, if the disambiguation dialog includes too many choices, the user may be overwhelmed by the number of choices, and fail to locate the desired choice from the large number of choices. Accordingly, a user's ease of use with a disambiguation dialog may have an important impact on the user's overall satisfaction with an automated agent.

Techniques are discussed herein to generate disambiguation dialogs in an optimal fashion.

SUMMARY OF THE INVENTION

As an overview of one embodiment of the invention, a set of candidate dialogs may be generated based on a user's message, each of the candidate dialogs may be evaluated in accordance with a metric, and a candidate dialog with the highest metric may be selected as disambiguation dialog to present to a user in response to the user's message. More specifically, an intent may be determined from the user's message based on a natural language unit (NLU) module. In a pre-triggering routine, a set of "skills" may be determined that are relevant to the determined intent, in which a skill may refer to a function provided by a third-party vendor in the context of a personal assistant. The intent may be provided to the set of skills and one or more candidate responses may be received from the set of skills to form a set of candidate responses.

Each of the one or more candidate responses may be paired with a utility value that specifies a utility of the candidate response to the user. Factors that determine a candidate response's utility value may include temporal constraints (e.g., whether an action specified in the candidate response can be currently carried out), and a type of resolution offered by the candidate response (e.g., whether the candidate response is a message that instructs the user to perform an action, or whether the candidate response is configured to perform an action that assists the user).

Each of the candidate responses may also be paired with a relevance probability that specifies a relevance of the candidate response to the user's need, as implicitly or explicitly specified in the user's message. The relevance probability of a candidate response may be computed based on the intent of the user's message, a conversation history of the user, a historical data and a user profile associated with the user.

An intermediate ranking may be computed for each of the candidate responses based on the utility value and the relevance probability. The candidate responses may be ordered from the candidate response with the highest intermediate rank to the candidate response with the lowest intermediate rank.

Candidate dialogs may be constructed from one or more of the candidate responses. More specifically, a candidate dialog may be formed that include only the top candidate response, the top two candidate responses, the top three candidate responses, and so on. Additional candidate dialogs may be generated by varying a presentation format of each of the candidate responses. The presentation format may refer to the verbosity level of the candidate response (e.g., long, medium, short), the presentation style of the text of the candidate response (e.g., font size, font color, font, use of underline, use of bold, use of italics, use of highlighting, spacing between lines, etc.), and/or the type of media used to present the candidate response (e.g., whether to include images, animations, video, hyperlinks, sound, etc.)

Within the context of a candidate dialog, each of the candidate responses may be paired with a discoverability probability that is defined, in one embodiment of the invention, as a probability that the user will select the candidate response when presented with the candidate dialog, conditioned upon the candidate response being relevant and having utility, a complexity of an entirety of the candidate dialog, a prominence of a manner in which the candidate response is presented within the candidate dialog, and a clarity in which the content of the candidate response is expressed.

A joint metric for each of the candidate dialogs may be computed as a function of the utility value, relevance probability and discoverability probability associated with each of the candidate responses included in the candidate dialog. More specifically, for candidate dialogues with a single candidate response, the joint metric of the candidate dialogue may be calculated as the product of the utility value, relevance probability and discoverability probability associated with the single candidate response. For the candidate dialogues with multiple candidate responses, the joint metric of the candidate dialogue may be calculated as the sum of the products of the utility value, relevance probability and discoverability probability associated with each of the candidate responses of the candidate dialogue. The highest ranked candidate dialog may be selected as the disambiguation dialog to present to the user in response to the user's message.

Upon being presented with the disambiguation dialog, various scenarios may play out. In a first scenario, the user may select one of the options offered by the disambiguation dialog (where an "option" refers to one of the candidate responses that are a part of a candidate dialog). In order to "learn" from the user's response, the automated agent may increase the relevance probability associated with the chosen option so that this option may be presented with greater likelihood in the future to other users. In a second scenario, the user may fail to select any of the options (known as a "drop off" event). In order to reduce the likelihood of future drop off events, the automated agent may decrease the joint metric associated with the presented candidate dialog, so that the presented candidate dialog is presented with less frequency in the future to other users. In a third scenario, the user may respond to the disambiguation dialog with a user-generated resolution that is distinct from any of the options presented in the disambiguation dialog. The automated agent may also learn from such input from the user. If the user-generated resolution is a candidate response that is known by the automated agent, but was just not included in the disambiguation dialog, the relevance probability of the user-generated resolution may be increased. If, however, the user-generated resolution is hereinbefore not known to the automated agent, the user-generated resolution may be added to a response datastore of the automated agent so that it may be included in future disambiguation dialogs.

These and other embodiments of the invention are more fully described in association with the drawings below.

BRIEF DESCRIPTION OF THE DRAWINGS

FIG. 5 depicts a selection of skills from a set of possible skills and the aggregation of responses from the selected skills into a set of candidate responses, in accordance with one embodiment of invention.

FIGS. 6A and 6B depict a table with a set of candidate responses, in accordance with one embodiment of the invention, in which each of the candidate responses is expressed in accordance with a certain presentation format.

FIG. 7 depicts a table with a set of candidate responses, in which each of the candidate responses is associated with a utility value and a relevance probability, in accordance with one embodiment of the invention.

FIG. 8 depicts a table with a set of candidate responses, in accordance with one embodiment of the invention, in which each of the candidate responses is associated with an intermediate ranking, and the set of candidate responses has been ordered in accordance with the intermediate ranking.

FIGS. 9A-9C depict a table with a plurality of candidate dialogues, in which each of the candidate dialogues is associated with a joint metric, in accordance with one embodiment of the invention.

FIG. 10 depicts a disambiguation dialogue that is presented in response to the user's message, the disambiguation dialogue being selected from the candidate dialogues presented in FIGS. 9A-9C, in accordance with one embodiment of the invention.

FIG. 11A depicts one possible continuation of the conversation from FIG. 10, in which the user selects one of the candidate responses, in accordance with one embodiment of the invention.

FIG. 11B depicts a relevance probability of selected candidate response being increased in response to the automated agent receiving the user's selection in FIG. 11A, in accordance with one embodiment of the invention.

FIG. 12A depicts another possible continuation of the conversation depicted in FIG. 10, in accordance with one embodiment of the invention, in which the user drops off from the conversation.

FIGS. 12B-12D depict the joint metric associated with the disambiguation dialog presented in FIG. 12A being decreased in response to the drop off event illustrated in FIG. 12A, in accordance with one embodiment of the invention.

FIG. 13A depicts another possible continuation of the conversation from FIG. 10, in which the response to the disambiguation dialog includes a user-generated resolution that was distinct from any of the options provided in the disambiguation dialog, in accordance with one embodiment of the invention.

FIG. 13B depicts a relevance probability of the user-generated candidate resolution being increased in response to the automated agent receiving the user-generated candidate resolution in FIG. 13A, in accordance with one embodiment of the invention.

DETAILED DESCRIPTION OF THE INVENTION

In the following detailed description of the preferred embodiments, reference is made to the accompanying drawings that form a part hereof, and in which are shown by way of illustration specific embodiments in which the invention may be practiced. It is understood that other embodiments may be utilized and structural changes may be made without departing from the scope of the present invention. Descriptions associated with any one of the figures may be applied to different figures containing like or similar components/steps.

Figure 1:
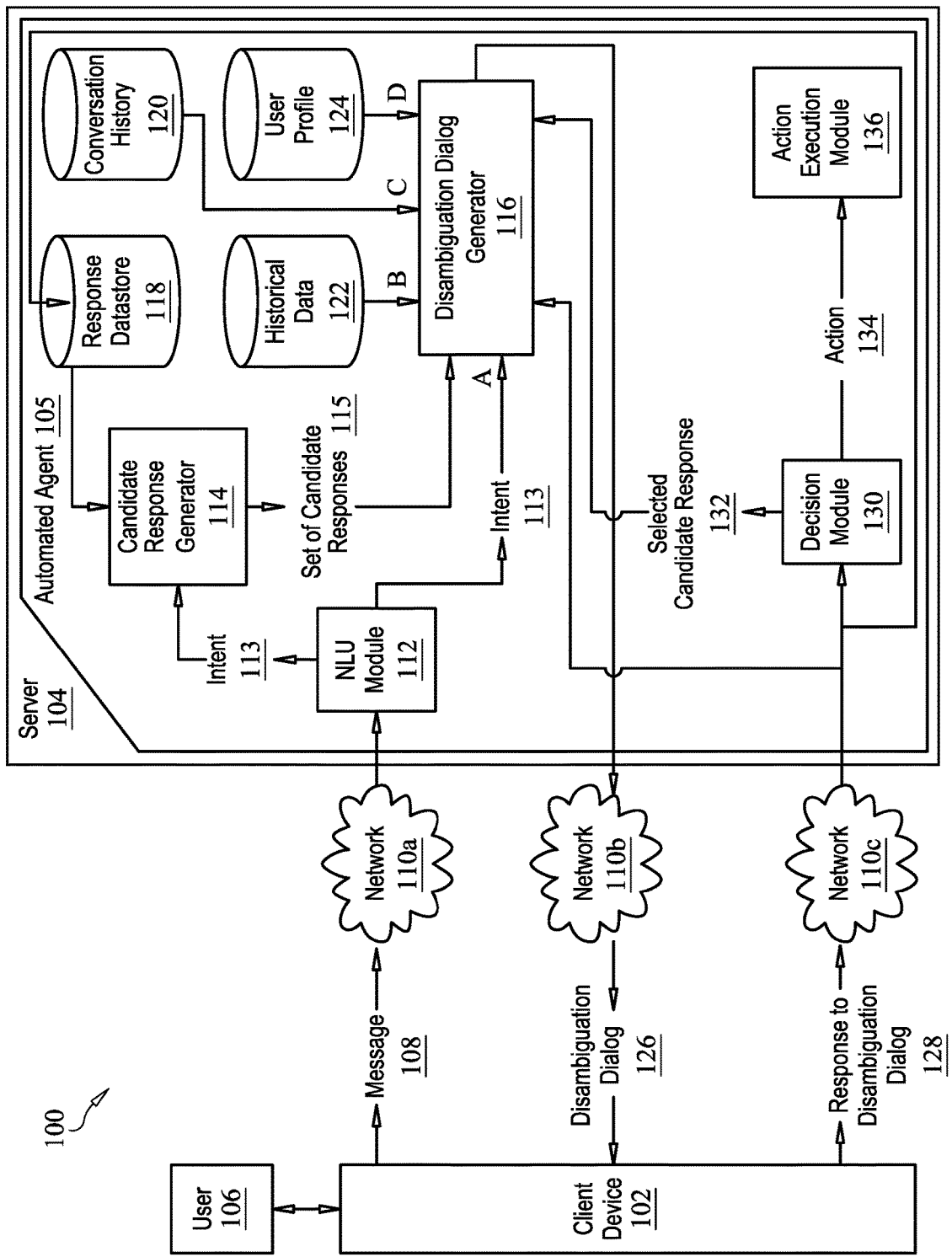
FIG. 1 depicts a system diagram with a client device communicatively coupled to an automated agent instantiated on a server, in accordance with one embodiment of the invention.

FIG. 1 depicts system diagram 100 with client device 102 communicatively coupled to server 104 via networks 110a, 110b and 110c. Networks 110a, 110b and 110c may be any form of communications means and, in some cases, may be individual communications links, or one or more communications networks, including private networks, public networks, and/or virtual private networks over public networks. While depicted as three separate networks 110a, 110b and 110c for ease of illustration, it is understood that networks 110a, 110b and 110c may be parts of a single network or network of networks.

User 106 may use client device 102 to transmit message 108 to automated agent 105 (e.g., chatbot, bot, etc.) instantiated on server 104. Message 108 may be a statement in which a request of the user is explicitly or implicitly stated. Importantly, some ambiguity (or uncertainty) may be associated with the proper response to message 108. In the example that will be discussed below, a user may transmit the message "I'm having some problems with the printer". The ambiguity may not be associated with the intent of the message, which may be "user needs help addressing an issue with the printer" or the like. Rather, the ambiguity may be associated with the proper response to the user's message. For example, does the user need to be referred to troubleshooting tips from a knowledge base; does the user need to speak with someone from the IT department; or does the user need to make an appointment with a technician to service the printer?

In order to resolve such ambiguity in the proper response to message 108, automated agent 105 may transmit disambiguation dialog 126 to client device 102 of user 106. Disambiguation dialog 126 generally refers to a message from automated agent 105 that requests the user to make a selection from a group of candidate responses to message 108. In many cases, disambiguation dialog 126 will be presented within a user interface of client device 102. However, it is also possible for disambiguation dialog 126 to presented in an aural manner (e.g., as a spoken prompt, followed by spoken candidate responses).

A systematic approach will be described below for generating a disambiguation dialog that maximizes a metric associated with the disambiguation dialog. Such metric, called the "joint metric" below, may be based on a relevance probability, a utility value and a discoverability probability associated with each of the candidate responses included within the disambiguation dialog. The computation of the joint metric as well as the meaning of a relevance probability, a utility value and a discoverability probability will be described in detail below.

Returning to the discussion of system diagram 100, message 108 may be received by natural language understanding (NLU) module 112 of automated agent 105, which may determine intent 113 of message 108. Example NLU modules include the Moveworks AI platform from Moveworks, Inc.® of Mountain View, Calif.; DialogFlow from Alphabet Inc.® of Mountain View, Calif.; and Language Understanding (LUIS) from Microsoft Corp.® of Redmond, Wash. If not already apparent, an intent may refer to a taxonomy or class into which a message from the user may be classified, the taxonomy or class referring to what the user intends to accomplish or attain. For example, all the following messages, "My laptop is not working", "My laptop has an issue", "I don't know what is wrong with my laptop" may be associated with the intent of "User needs help resolving a problem with his/her laptop".

Figure 2:
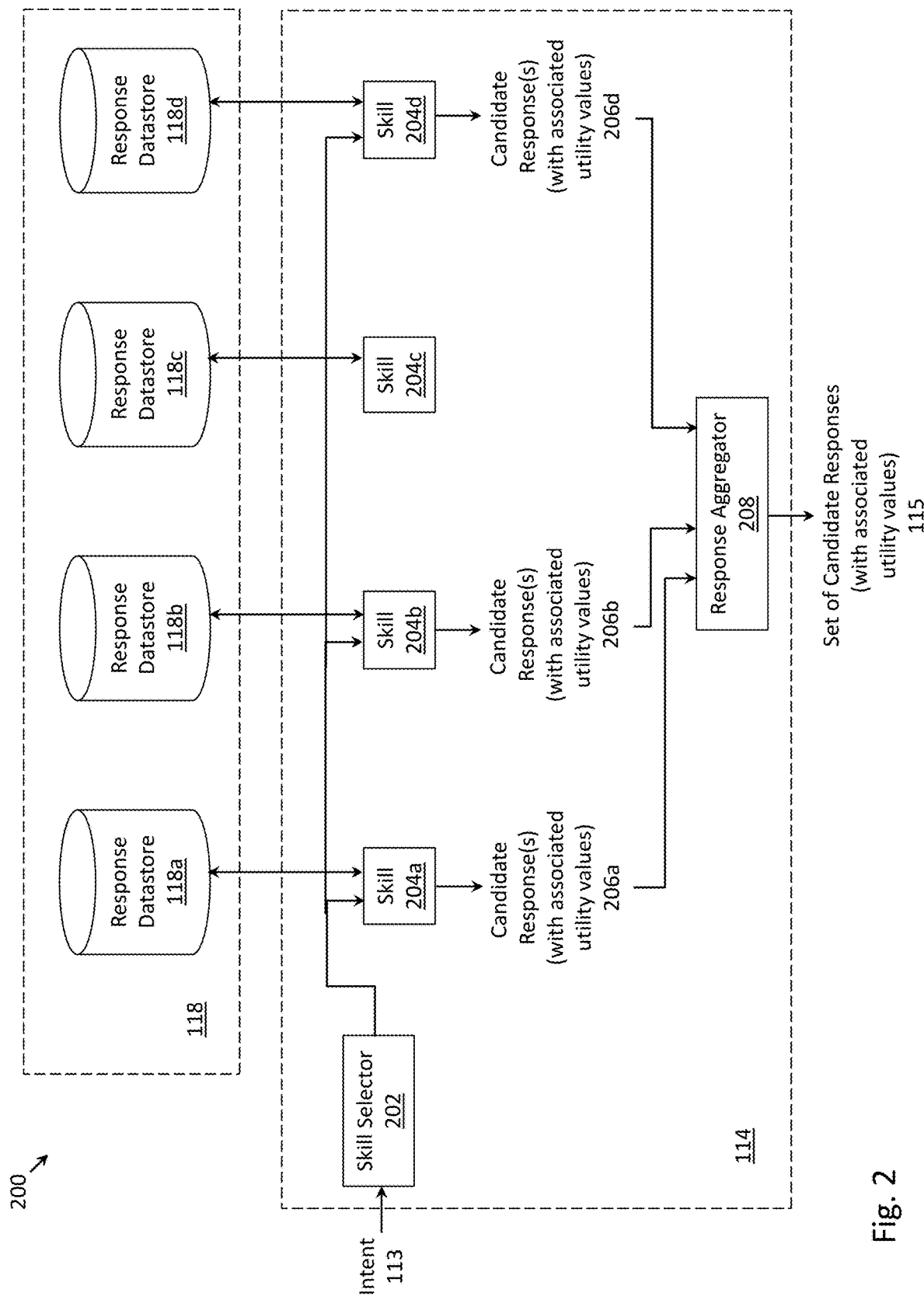
FIG. 2 depicts a block diagram with additional details of the candidate response generator and response datastore of the automated agent, in accordance with one embodiment of the invention.

Candidate response generator 114 may receive the determined intent 113 from NLU module 112, and determine a set of candidate responses 115 from the responses stored in response datastore 118 that match intent 113. FIG. 2 will provide additional details of one embodiment of response datastore 118 and candidate response generator 114.

Based on intent 113 (also labelled as signal A), historical data 122 (also labelled as signal B), conversation history 120 (also labelled as signal C) and user profile 124 (also labelled as signal D), disambiguation dialog generator 116 may generate disambiguation dialog 126 that includes a subset of the candidate responses from the set of candidate responses 115.

Historical data 122 may refer to previous actions and/or message from user 106 or other users. For example, historical data 122 may reveal which candidate response(s) from response datastore 118 were most frequently presented to the employees of an enterprise in response to a certain intent.

Conversation history 120 may refer to the previous conversation(s) between user 106 and automated agent 105. More particularly, conversation history 120 may include previous conversation between user 106 and automated agent 105, including messages 108 from user 106 as well as previous responses 128 (e.g., answer choices) from user 106 to disambiguation dialogs. The weight and/or emphasis to place on a previous conversation from the conversation history 120 may depend on a recency of the previous conversation. If the previous conversation is recent (e.g., from the last hour), more consideration may be given to the previous conversation, as compared to a previous conversation that occurred a while ago (e.g., 1 week ago). The recency of a previous conversation may also influence a determination of whether message 108 is a continuation of the previous conversation between user 106 (in which more consideration of the previous conversation may be given when constructing a disambiguation dialog) and automated agent 105, or whether message 108 is the start of a new conversation with automated agent 105 (in which less consideration of the previous conversation may be given when constructing a disambiguation dialog).

User profile 124 may include demographic information of a user, such as the user's gender, age, place of residence, etc. User profile 124 may also include the user's interests, whether it may be classical music, football, vegan food, etc. User profile 124 may also include an employee's job title, his/her seniority, whether he/she is currently on vacation, on paternity/maternity leave, etc.

In response to disambiguation dialog 126 being presented to user 106 via client device 102, user 106 may or may not provide a response 128 to disambiguation dialog 126. A response 128 may include the user's selection of one (or more) of the candidate responses included in disambiguation dialog 126. Alternatively, response 128 may include a user-generated response to message 108 that is distinct from any option provided in the disambiguation dialog 126.

Decision module 130 may receive the user's response 128, and decide whether an associated action should be performed or whether additional disambiguation is needed. If an associated action should be performed, decision module 130 may transmit action 134 to action execution module 136. For example, decision module 130 may determine that the action of "order toner" should be performed in response to the user's response to "place an order on toner", and in response, transmit the action 134 of "order toner" to action execution module 136. In many instances, action execution module 136 may be a software process that is configured to perform an action (e.g., order toner, schedule an appointment, request a loaner laptop) without the involvement of a human agent, although in some instances, the assistance of a human agent (in which a "human agent" may generally refer to any human) might be requested (e.g., to obtain authorization to purchase a new piece of equipment, etc.). If additional disambiguation is needed, decision module 130 may transmit the selected candidate response 132 (or more generally, the user's response 128) to disambiguation dialog generator 116. Disambiguation dialog generator 116 may generate disambiguation dialog 126 similar to the process described above, except that the selected candidate response 132 may be substituted in place of intent 113.

The user's response 128 may also be provided to disambiguation dialog generator 116 in order to adjust the relevance probability of a candidate response. The user's response 128 may also be provided to response datastore 118 if the user's response is a response that was not previously included in response datastore 118. Such details will become clearer in the examples provided below in association with FIGS. 11A and 13A.

FIG. 2 depicts block diagram 200 with additional details of candidate response generator 114 and response datastore 118. Candidate response generator 114 may include skill selector 202 that is configured to select one or more skills based on intent 113. As is known in the art, a skill may refer to a function provided by a third-party vendor, such as Amazon, Inc.® of North Seattle, Wash.; SAP® of Walldorf, Germany; Microsoft Corp.® of Redmond, Wash.; and Salesforce.com, Inc.® from San Francisco, Calif. A third-party vendor more generally refers to a vendor other than the vendor that provides automated agent 105. Example skills may include a search skill, a news skill, a video skill, a form filling skill, a card skill, a weather skill, a map skill, a help desk skill, a voice skill, etc. In other settings such as in a smart phone, skills are more commonly referred "apps".

In the example of FIG. 2, skill selector 202 selects skills 204a, 204b and skill 204d based on intent 113. The selection of one or more skills by skill selector 202 may be performed via a table lookup routine, in which an intent is mapped to one or more skills. More generally, the selection of one or more skills by skill selector 202 may be performed using a machine learning module (not depicted). Parameters of the machine learning module may be trained with known mappings from intents to skills (i.e., skills that are known to be suitable for one or more intents), and subsequently, when provided with an intent, the trained machine learning module provide one or more skills that are suitable for the intent.

Skill selector 202 may provide intent 113 to each of the selected skills. In the example of FIG. 2, intent 113 is provided to skills 204a, 204b and 204d, but not skill 204c. Each of the selected skills may retrieve one or more candidate responses from its associated response datastore. In the example of FIG. 2, skill 204a retrieves candidate responses 206a from response datastore 118a; skill 204b retrieves candidate responses 206b from response datastore 118b; and skill 204d retrieves candidate responses 206d from response datastore 118d.

Each of the candidate responses may be paired with an associated utility value by the skill. In the preferred embodiment, the utility value may be a real number between 0 and 1 (inclusive), while a real number above 1 may be possible in other embodiments. The utility value of candidate response 202a may be determined by a skill by evaluating business logic (e.g., if-then statements). For example, business logic could evaluate a candidate response against a certain temporal constraint in order to determine the utility value of a candidate response. For example, the utility value of a candidate response to call a financial advisor may be high (e.g., 0.8) during regular business hours (e.g., 9 AM-6 PM), but may be low (e.g., 0.2) outside of regular business hours, when the financial advisor is out of the office. As another example, a user might request to purchase airplane tickets for a conference scheduled for 2 Feb. 2020. Based on business logic, a high utility value may be associated with a flight to the conference location on 31 Jan. 2020 (prior to the conference), and a low utility value may be associated with a flight to the conference location on 3 Feb. 2020 (after the conference). As another example, the temporal constraint may be whether an action specified in the candidate response can be currently carried out (e.g., carried out in the next hour, next day, etc. after receipt of the user's message). For example, in response to a message from the user describing theft of his/her laptop, a candidate response may offer the solution of borrowing a loaner laptop. The utility value of borrowing a loaner laptop might be high if a loaner laptop is currently available, and low if no loaner laptop is currently available.

In addition or in the alternative, the utility value associated with a candidate response may be based on a type of resolution offered by the candidate response, in which the type of resolution includes at least one of an instructive message that educates the user on how to resolve an issue specified in the intent, or an action that is performed (either by the automated agent or an individual other than the user) to resolve the issue specified in the intent. For example, a candidate response with the action of automatically downloading and installing a software patch might be assigned a higher utility value than a candidate response with a link to a knowledge-base article with instructions on how to download and install the same software patch. In the embodiment depicted in FIG. 2, utility values for the candidate responses were provided by the skills, but it is possible that the skills could return candidate responses without utility values, and a separate software module (e.g., a utility value generator) could compute a utility value for each of the candidate responses.

Response aggregator 208 may aggregate the candidate responses (206a, 206b, 206d) into a set of candidate responses 115. If not already apparent, response datastores (118a, 118b, 118c and 118d) may be part of response datastore 118; and skill selector 202, skills (204a, 204b, 204c and 204d), and response aggregator 208 may be part of candidate response generator 114. While four skills have been depicted, it is understood that one or more skills may be relied upon by automated agent 105 in general. Further, for simplicity of representation, skills (204a, 204b, 204c and 204d) and response datastores (118a, 118b, 118c and 118d) have been represented as part of automated agent 105, while in practice, such skills and response datastores may be external to automated agent 105 and be accessed by automated agent 105 via an application programming interface (API) of the third-party vendor.

Figure 3:
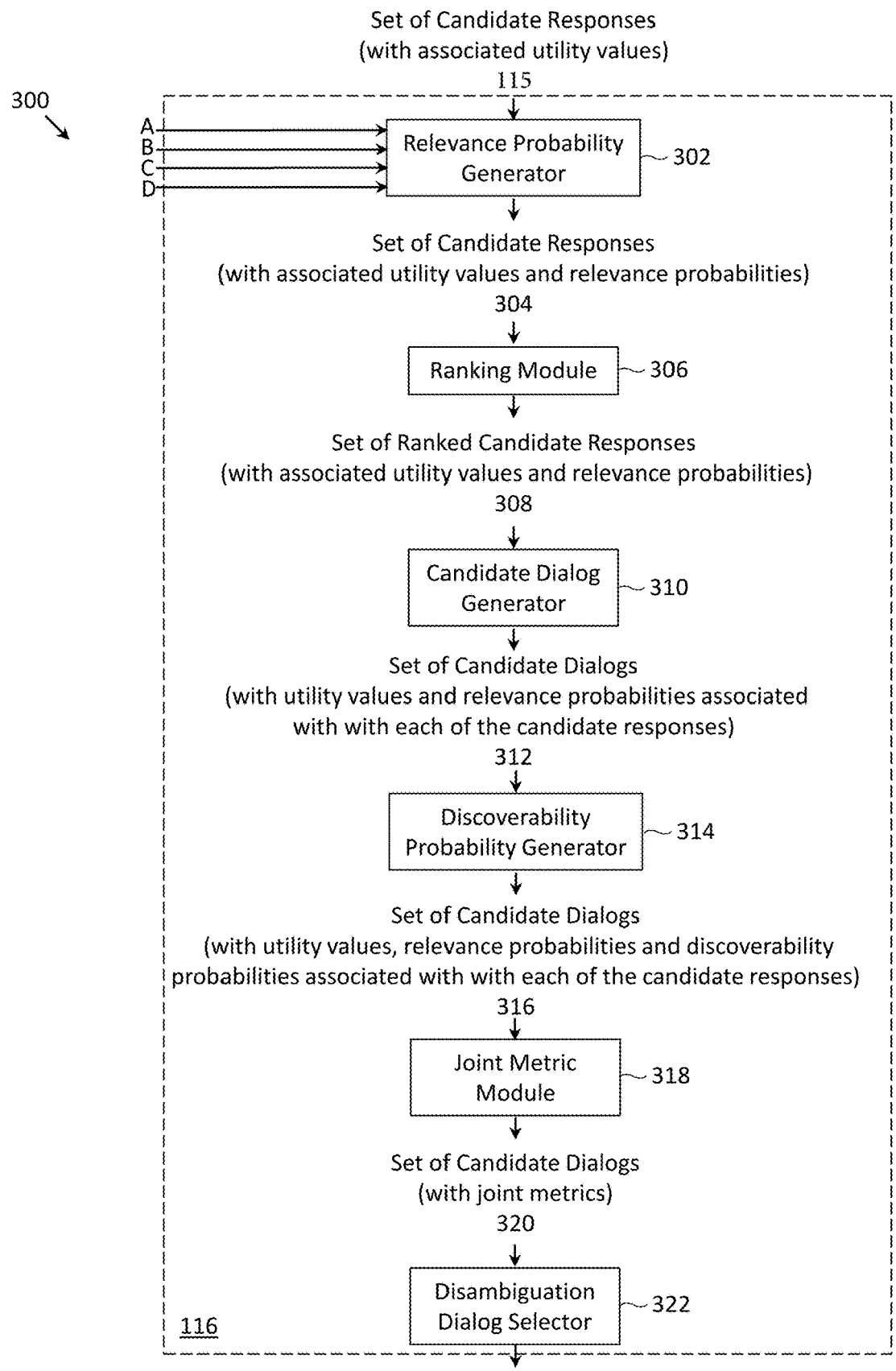
FIG. 3 depicts a block diagram with additional details of the disambiguation dialogue generator of the automated agent, in accordance with one embodiment of the invention.

FIG. 3 depicts block diagram 300 with additional details of disambiguation dialogue generator 116. Disambiguation dialogue generator 116 may include relevance probability generator 302, which computes a probability that candidate response 202a is relevant to the user's (explicit or implicit) need as specified in message 108 (i.e., the relevance probability) based on one or more of intent 113, historical data 122, conversation history 120 and user profile 124. More specifically, the relevance probability of a candidate response may be based on how closely the candidate response is related to intent 113. In addition or in the alternative, the relevance probability of a candidate response 202a may be based on how closely the candidate response is related to messages from user 106 received prior to the message 108, as stored in conversation history 120. In addition or in the alternative, the relevance probability of a candidate response may be based on how closely the candidate response is related to messages provided by and/or the answer choices selected by user 106 prior to receiving message 108, as stored in conversation history 120. In addition or in the alternative, the relevance probability of a candidate response may be based on how closely the candidate response is related to messages provided by and/or answer choices selected by other users prior to receiving message 108, as stored in historical data 122. In addition or in the alternative, the relevance probability of a candidate response may be based on how closely a candidate response is related to attributes stored in user profile 124. In an embodiment in which the relevance probability is based on a plurality of the four aforementioned factors, the relevance probability may be computed as the product of contributions from each of the factors or as a linear combination of contributions from each of the factors. In the context of FIG. 3, the relevance probability generator 302 may receive, as an input, a set of candidate responses 115 with utility values associated with each of the candidate responses, and generate, as an output, a set of candidate responses 304 with utility values and relevance probabilities associated with each of the candidate responses. Examples of candidate responses with their associated utility values and relevance probabilities are provided below in FIG. 7.

Disambiguation dialog generator 116 may also include ranking module 306, which ranks and orders the set of candidate responses 115 based on the product of the utility value and the relevance probability associated with each of the candidate responses. An example of the output 308 of ranking module 306 is provided below in FIG. 8, in which the product of the utility value and the relevance probability is labeled as an "intermediate ranking".

Disambiguation dialog generator 116 may also include candidate dialog generator 310 that generates a plurality of candidate dialogs 312 from the set of ranked candidate responses 308. Each candidate dialog may include a prompt (e.g., "please select one of the following choices") and a subset of the set of candidate responses 115, in which each of the candidate responses are presented in the candidate dialog in accordance with a presentation format. In one embodiment, the presentation format may be one of a long presentation format, a medium presentation format and a short presentation format. For example, for a candidate response embodied as an article, the long presentation format of the article may include an entirety of the article, the medium presentation format of the article may include a snippet of the article, and the short presentation format of the article may include a link to the article.

Disambiguation dialog generator 116 may also include discoverability probability generator 314 that generates a discoverability probability for each of the candidate responses in the context of a candidate dialog. At a high level, the discoverability probability of the candidate response may indicate the probability that a user will read and understand the candidate response within a candidate dialog. The discoverability probability may be computed based on a variety of factors, including one or more of the above-described presentation format of the candidate response, a vertical dimension of a screen area of the candidate dialog, a total number of candidate responses included in the candidate dialog, a fraction of a screen area of the candidate dialog that is occupied by the candidate response (e.g., with a larger fraction of the screen area typically associated with a higher discoverability probability), a prominence of a manner in which the candidate response is presented within the candidate dialog (e.g., whether a large or small font size is used, whether all-caps are used, whether a bold font is used, etc.) and the clarity in which the content of the candidate response is expressed (e.g., whether proper punctuation is used, whether there are any misspellings, whether there are any grammatical issues, whether candidate response 202a is written in a concise manner, etc.).

In a preferred embodiment of the invention, the discoverability probability of a candidate response in the context of a candidate dialog is computed as a probability that the user will select the candidate response when presented with the candidate dialog, conditioned upon the candidate response being relevant and having utility, a complexity of an entirety of the candidate dialog, a prominence of a manner in which the candidate response is presented within the candidate dialog, and a clarity in which a content of the candidate response is expressed. In such a computation, the discoverability probability for a candidate response may be computed independently of the current relevance probability and utility value of the candidate response. For example, in a scenario in which the current relevance probability or the current utility value of a candidate response is low, the computation of the discoverability probability of that candidate response may ignore the current relevance probability and utility value of the candidate response and assume the condition that the candidate response is relevant and has high utility.

In the context of FIG. 3, the discoverability probability generator 302 may receive, as an input, a set of candidate dialogs 312 with utility values associated with each of the candidate responses, and generate, as an output, a set of candidate dialogs 316 with utility values, relevance probabilities and discoverability probabilities associated with each of the candidate responses. Examples of candidate dialogs with their associated utility values, relevance probabilities and discoverability probabilities are provided below in FIGS. 9A-9C.

Disambiguation dialog generator 116 may also include joint metric module 318 that computes a joint metric for each of the candidate dialogs. The joint metric for a candidate dialog may be computed as a function of the relevance probability, the utility value, and the discoverability probability associated with each of the one or more candidate responses included within the candidate dialog. In the context of FIG. 3, joint metric module 318 may receive, as an input, a set of candidate dialogs 316 with utility values, relevance probabilities and discoverability probabilities associated with each of the candidate responses, and generate, as an output, a set of candidate responses 320 with a joint metric associated with each of the candidate dialogs. The computation of the joint metric will be more clearly understood in association with the example provided in FIGS. 9A-9C below.

Disambiguation dialog generator 116 may also include disambiguation dialog selector 322 that selects the candidate dialog with the highest joint metric as the disambiguation dialog 126 to present to the user. In the next set of figures, FIGS. 4-13B, specific examples of the concepts described above in FIGS. 1-3 will be provided.

Figure 4:
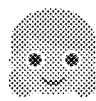
FIG. 4 depicts a message communicated from a user to an automated agent, in accordance with one embodiment of the invention.

FIG. 4 depicts an example of message 108 that is communicated from user 106 to automated agent 105. In FIG. 4, the user is named Alice, and the message is "I'm having some problems with the printer". In accordance with system diagram 100 depicted in FIG. 1, message 108 is received by automated agent 105, specifically by NLU module 112, which determines intent 113 based on message 108. Continuing with the current example, NLU module 112 may generate intent 113 (e.g., "user needs help addressing an issue with the printer") from message 108. Further, in accordance with system diagram 100 depicted in FIG. 1, intent 113 may be provided to candidate response generator 114.

Based on intent 113, the skills of search, form filling, help desk and customer support may be selected from the available skills of search, form filling, help desk, customer support, weather and news, as shown in FIG. 5 It is understood that in practice there may be many more skills that are available, but the present simplified example just includes six possible skills. As further depicted in FIG. 5, each of the selected skills may return one or more candidate responses, more specifically, one or more identifiers (IDs) that identify one or more candidate responses. The search skill returns candidate response ID "R1"; the form filling skill returns candidate response IDs "R2, R3, R4 and R5"; the help desk skill returns the candidate response ID "R6"; and the customer support skill returns the candidate response ID "R7". In the example of FIG. 5, the reason for returning candidate response IDs is that the text of a candidate response may not be fully determined until the presentation format is also specified (as depicted in FIG. 6). For conciseness of explanation, the term "candidate response" may refer to an identifier of a candidate response (as in the context of FIG. 5) or may refer to the candidate response itself (as in one of the options of a disambiguation dialog, as depicted FIG. 10).

As also depicted in FIG. 5, each of the candidate responses may be associated with a utility value. Candidate response R1 may be associated with a utility value of 0.5; candidate response R2 may be associated with a utility value of 0.1; and so on. The higher the utility value, the more utility a candidate response likely has to user 106. As an example, based on the utility values provided in FIG. 5, candidate response R1 is estimated to have more utility to user 106 than candidate response R2.

FIG. 5 may be more clearly understood in reference to FIGS. 6A and 6B, which depicts the text of each candidate response in accordance with a certain presentation format. Candidate response R1, in accordance with a long presentation format, reads as follows: "Common troubleshooting tips for a printer include: 1) check for paper jams; 2) check connection between computer and printer; 3) check toner level; 4) check paper level". Candidate response R1, in accordance with a medium presentation format, reads as follows: "Click link to view printer troubleshooting tips. Common troubleshooting tips for a printer include: . . . ". Candidate response R1, in accordance with a short presentation format, reads as follows: "Click link to view printer troubleshooting tips". In the present example, it is understood that the user action of "clicking" the link would display candidate response R1 in accordance with the long presentation format.

In the context of FIGS. 6A and 6B, the skill associated with each of the candidate responses can be better appreciated. Candidate response R1, related to an article with troubleshooting tips, may be an online article that is returned by the search skill. Candidate response R2, related to placing an order for a new printer, may involve completing a purchase order form that is returned by the form filling skill. Candidate response R3, related to sending a technician to service the printer, may involve completing an online form (e.g., with slots for the make and model number of printer, preferred service time, etc.) that is returned by the form filling skill. Candidate response R4, related to ordering paper, may involve completing a purchase order form (e.g., with slots for specifying the amount of paper and shipping speed) that is returned by the form filling skill. Candidate response R5, related to ordering toner, may involve completing a purchase order form (e.g., with slots for specifying the number of toner cartridges and shipping speed) that is returned by the form filling skill. Candidate response R6, related to contacting the internal IT support of an enterprise, may be facilitated by a help desk skill. Lastly, candidate response R7, related to contacting the printer manufacturer, may be facilitated by a customer support skill provided by the printer manufacturer.

In the context of FIGS. 6A and 6B, utility values associated with each of the candidate responses can also be better appreciated. As previously described, the utility value associated with a candidate responses may be based on the type of resolution provided by a candidate response, with an action-based resolution generally having a higher utility value than an instruction-based resolution. In the present case, candidate response R1 (related to common troubleshooting tips) has a moderately low utility value of 0.5, because it is an instruction-based resolution. Also as previously described, the utility value associated with a candidate response may be based on a temporal constraint. In the example of candidate response R2 (related to ordering a new printer), based on the conversation history of the user, automated agent 105 may be aware that user 106 is a professor at a university, and the reason the user needs to use the printer is to print out exams for a final exam scheduled three days later. Based on historical data 122, automated agent 105 may be aware that the purchase of a new printer at the university typically takes a least a week. As a new printer will not arrive prior to the final exam, a low utility value of 0.1 is associated with candidate response R2. Candidate response R3 (related to sending a technician to service the printer) has a high utility value of 0.8 since automated agent 105 has a priori knowledge that a technician has a 24 hour response time, and should be able to resolve the printer issue prior to the day of the final exam. Candidate responses R4 and R5 (related to the ordering of paper and toner) likewise have a high utility value of 0.8 since automated agent 105 has a priori knowledge that paper and toner can be shipped in 2 days, prior to the day of the final exam. Candidate response R6 (related to contacting IT support) likewise has a high utility value of 0.8 since automated agent 105 has a priori knowledge that the IT support of the university is staffed 24-hours a day, and thus the professor can get in contact with someone even though it is late at night (see time of Alice's message of 11:03 PM in FIG. 4). In contrast, candidate response R7 (related to contacting the printer manufacturer) has a low utility value of 0.1, because the customer support department of the printer manufacturer only operates during regular business hours, and most likely would not respond to the user at the current time.

In the example of FIGS. 6A-6B, the presentation format more specifically related to a verbosity level of the candidate response. In other embodiments, the presentation format could alternatively or additionally relate to the presentation style of the text of the candidate response (e.g., font size, font color, font, use of underline, use of bold, use of italics, use of highlighting, spacing between lines, etc.), and/or the type of media used to present the candidate response (e.g., whether to include images, animations, video, hyperlinks, sound, etc.).

FIG. 7 depicts the set of candidate responses, in which each of the candidate responses is additionally associated with a relevance probability. In the present example, candidate response R7, related to contacting the printer manufacturer, has the highest relevance probability of 0.19, because the customer support of the printer manufacturer is expected to be the most skilled at addressing an issue with the printer. The most relevant candidate response is closely followed by candidate responses R1, R3 and R6, each associated with a relevance probability of 0.18. Candidate response R1 (related to common troubleshooting tips), candidate response R3, (related to sending a technician to service the printer), and candidate response R6 (related to contacting IT support) are considered sufficiently pertinent to the intent of (e.g., "user needs help addressing an issue with the printer"), and thus have a high relevance probability. Candidate response R4 (related to ordering paper) and candidate response R5 (related to ordering toner) have a lower relevance probability of 0.05 and 0.07, respectively, because automated agent 105 is aware that user 106 recently ordered paper and toner based on information stored in conversation history 120, so automated agent 105 can infer that such measures would not likely address the user's needs.

In the example of FIG. 7, the relevance probabilities also form a probability distribution, in accordance with a preferred embodiment of the invention. As is known in the art, a probability distribution has the properties that each of the probabilities is non-negative and all of the probabilities of the distribution sum to one. In another embodiment (not depicted), the relevance probabilities could be values between 0 and 1, without forming a probability distribution.

FIG. 8 depicts the set of candidate responses, in which each of the candidate responses is further associated with an intermediate ranking, and the set of candidate responses has been ordered in accordance with the intermediate rankings, from highest intermediate ranking to lower intermediate ranking. The intermediate ranking of a candidate response may be computed as the product of the utility value and the relevance probability. The term "intermediate ranking" is used to distinguish this ranking discussed in FIG. 8 from the "joint metric" that will be later discussed in FIGS. 9A-9C. In the example of FIG. 8, candidate response R6, related to contacting IT support, has the highest intermediate ranking of 0.144; followed by candidate response R3, related to sending a technician to service the printer, with an intermediate ranking of 0.126; followed by candidate response R1, related to presenting troubleshooting tips, with an intermediate ranking of 0.09; and so on. Generally, higher intermediate rankings are associated with good candidate responses to present to the user. Accordingly, candidate response R7, related to contacting the printer manufacturer, and candidate response R2, related to ordering a new printer, are considered to be poor options, primarily due to their low respective utility values.

FIGS. 9A-9C depict a table with a plurality of candidate dialogues, in which each of the candidate dialogues is associated with a joint metric. Each of the candidate dialogs includes one or more of the candidate responses. In the table of FIGS. 9A-9C, candidate dialogues 1-3 each include a single candidate response; candidate dialogues 4-12 each include two candidate responses; and candidate dialogues 13-39 each include three candidate responses. More specifically, candidate dialogues 1-3 each include the candidate response with the highest intermediate ranking (i.e., R6); candidate dialogues 4-12 each include the candidate responses with the two highest intermediate rankings (i.e., R6 and R3); and candidate dialogues 13-39 each include the candidate responses with the three highest intermediate rankings (i.e., R6, R3 and R1).

Candidate dialogs 1-3 are identical to one another, except for the variation in the presentation format (i.e., long, medium, short) of the candidate response. Candidate dialogs 4-39 are identical to one another, except for the variation in the presentation format (i.e., long, medium, short) associated with each of the candidate responses. Candidate dialogs 4-39 include all possible permutations of the presentation format across the candidate responses. For conciseness of presentation, the candidate dialogs presented in FIGS. 9A-9C contain at most three candidate responses, but it is possible for candidate dialogues to include four candidate responses, five candidate responses, and so on.

A joint metric is computed for each of the candidate dialogues. For the candidate dialogues with a single candidate response, the joint metric of the candidate dialogue may be calculated as the product of the utility value, relevance probability and discoverability probability associated with the single candidate response. For example, for candidate dialogue 1, the joint metric of 0.1152 is calculated as 0.8*0.18*0.8. For the candidate dialogues with multiple candidate responses, the joint metric of the candidate dialogue may be calculated as the sum of the product of the utility value, relevance probability and discoverability probability associated with each of the candidate responses of the candidate dialogue. For example, for candidate dialogue 4, the joint metric of 0.1098 is calculated as 0.8*0.18*0.5+ 0.7*0.18*0.3.

For candidate dialogs 1-3 with a single candidate response, the discoverability probability is highest for the short presentation format. The conciseness of "Contact IT support" makes it likely that a user will finish reading this candidate response, and at the same time, its meaning is clear. In contrast, the discoverability probability was lower for the long presentation format, as its verbosity decreased the likelihood that a user would finish reading and understand the candidate response. Such correlation between the length of the presentation format and the discoverability probability may not hold true in general, and depends on many factors which could vary. For instance, one could imagine that if a short presentation format obscures the meaning of the candidate response, that candidate response might have a lower discoverability probability.

For candidate responses 4-39 with multiple candidate responses, the order in which the candidate responses are presented in the table of FIGS. 9A-9C for each of the candidate dialogs, by convention, is the order in which the candidate responses are presented in a candidate dialog. For example, candidate response R6 is presented as the first option for candidate dialog 4, and candidate response R3 is presented as the second option for candidate dialog 4.

For candidate dialogs with multiple candidate responses, the discoverability probability is generally higher for the first option as it is expected that a user will generally read the first option before reading the other options, and user fatigue or impatience will decrease the likelihood that the user will read each successive option. For example, in candidate dialog 4, the discoverability probability of the first candidate response (i.e., 0.5) is higher than the discoverability probability of the second candidate response (i.e., 0.3).

For candidate dialogs with multiple candidate responses, the discoverability probability is generally higher for candidate responses that occupy a larger portion of the display screen. Therefore, whenever a mismatch exists in the respective presentation formats of candidate responses within a candidate dialog (e.g., short, short, long), the discoverability associated with the candidate response(s) presented in accordance with the longer presentation formats will generally be higher than the candidate response(s) presented in accordance with the shorter presentation formats. For example, in candidate dialog 37, the discoverability of candidate response R1 (with a long presentation format) is the highest within the candidate dialog, even though it is presented last in the candidate dialog.

If not already apparent, it is noted that the discoverability probability associated with a candidate response presented in accordance with a certain presentation format may not be a fixed number, but may vary depending on the candidate dialog within which the candidate response is presented. For example, candidate response R6 (with a long presentation format) in candidate dialog 1 has a discoverability probability of 0.8, while the same candidate response R6 (with a long presentation format) in candidate dialog 4 has a discoverability probability of 0.5.

Lastly, it is noted that in the preferred embodiment, the discoverability probabilities of the candidate responses within a candidate dialog generally do not form a probability distribution (i.e., generally, do not sum to 1). The reason is that, in the preferred embodiment, a discoverability probability is expressed in terms of a conditional probability, and these conditional probabilities may not be part of the same probability distribution as the conditions of the conditional probabilities may not be uniform.

As previously described in FIG. 3, the candidate dialog with the highest joint metric is selected as the disambiguation dialog to present to the user. In the present example of FIGS. 9A-9C, candidate dialog 21 has the highest joint metric of 0.1548 so it is selected as the disambiguation dialog to present to the user.

FIG. 10 depicts message 108 from user 106 (i.e., Alice), followed by disambiguation dialog 126 from automated agent 105 (i.e., Bot). Disambiguation dialog 126 corresponds to candidate dialog 21 from FIGS. 9A-9C. Option 1 of disambiguation dialog 126 corresponds to the long presentation format of candidate response R6 and reads "In a few quick and easy steps, you can be connected with IT Support. Did you want to connect with IT Support through chat, video conference or a telephone call?". Option 2 of disambiguation dialog 126 corresponds to the short presentation format of candidate response R3 and reads "Send technician to service printer". Option 3 of disambiguation dialog 126 corresponds to the short presentation format of candidate response R1 and reads "Click link to view printer troubleshooting tips". It is noted that disambiguation dialog 126 may include an introductory prompt such as "Here are some options:" (as depicted), or a similar prompt such as "Please select one of the following options:".

FIG. 11A depicts one possible continuation of the conversation from FIG. 10, in which the user selects one of the candidate responses. In the example of FIG. 11A, the user replies with the message 128: "Great! Please send a technician" in order to select option 2. In response, the automated agent replies with the message 138: "Ok, the technician will drop by tomorrow around 3 PM. Did you need anything else?". In response, the user replies with message 140: "I'm good. Thanks!".

FIG. 11B depicts an updating of a relevance probability of the selected candidate response, following the conversation depicted in FIG. 11A. The user's selection of the candidate response "Send technician to service printer" may be treated as evidence supporting the relevance of the candidate response to the user's need. In the present example, the relevance probability of the selected candidate response has been increased by 0.06, and the relevance probabilities of the other candidate responses have been decreased by 0.01 (so as to maintain the probability distribution). Following the conversation depicted in FIG. 11A and the updating discussed in FIG. 11B, the conversation depicted in FIG. 11A and the updated relevance probabilities depicted in FIG. 11B may be stored in conversation history 120 and/or historical data 122, which in turn may have an impact on the future generation of disambiguation dialogs for the current user as well as other users.

FIG. 12A depicts another possible continuation of the conversation from FIG. 10, in which the user drops off from the conversation. In other words, the user provides no response to the disambiguation dialog of automated agent 105. FIG. 12C depicts the updating to the joint metric of the candidate dialog corresponding to the presented disambiguation dialog that may be performed in response to the user drop off. In the example of FIG. 12C, the joint metric of candidate dialog 21 was lowered from 0.1548 to 0.1368 by decreasing the discoverability probability associated with each of the candidate responses of candidate dialog 21 by 0.05. One outcome of such updating is that candidate dialog 21 is no longer the candidate dialog with the highest joint metric. Instead, candidate dialog 3 depicted in FIG. 12B is now the candidate dialog with the highest joint metric (i.e., 0.144). If the user were to transmit message 108 again to automated agent 105 at this point, candidate dialog 3 would be selected as the disambiguation dialog to present to the user.

FIG. 13A depicts another possible continuation of the conversation from FIG. 10, in which the response to the disambiguation dialog includes a user-generated resolution that was not included in the disambiguation dialog. In the example of FIG. 13A, the user responds to disambiguation dialog 126 with message 128: "You know what, it looks like the printer just ran out of paper. Oh no, looks like the printer room is out of paper. Can you order some paper and request 2-day shipping for the order?". The automated agent then responds with message 142: "Done. Paper has been ordered with 2-day shipping. Your confirmation number is XYZ123". Finally, the user may transmit message 144 that suggests the conversation with the bot has resulted in a successful resolution: "Thanks!".

In the present example, the user-generated resolution does not match any of the candidate responses of the presented disambiguation dialog 126, but it does match one of the candidate responses returned by candidate response generator 114 (i.e., candidate response R4 related to ordering paper). Therefore, as shown in FIG. 13B, the relevance probability of candidate response R4 has been increased (e.g., in this particular example by 0.06), and to maintain the probability distribution, the relevance probabilities of the other candidate responses has been decreased (e.g., in this particular example by 0.01). Following the conversation depicted in FIG. 13A and the updating discussed in FIG. 13B, the conversation depicted in FIG. 13A and the updated relevance probabilities depicted in FIG. 13B may be stored in conversation history 120 and/or historical data 122, which in turn may have an impact on the future generation of disambiguation dialogs for the current user as well as other users. If, however, the user-generated resolution does not match any of the candidate responses returned by candidate response generator 114, the user-generated resolution may be stored in response datastore 118 (assuming it is not already stored therein).

Figure 14:
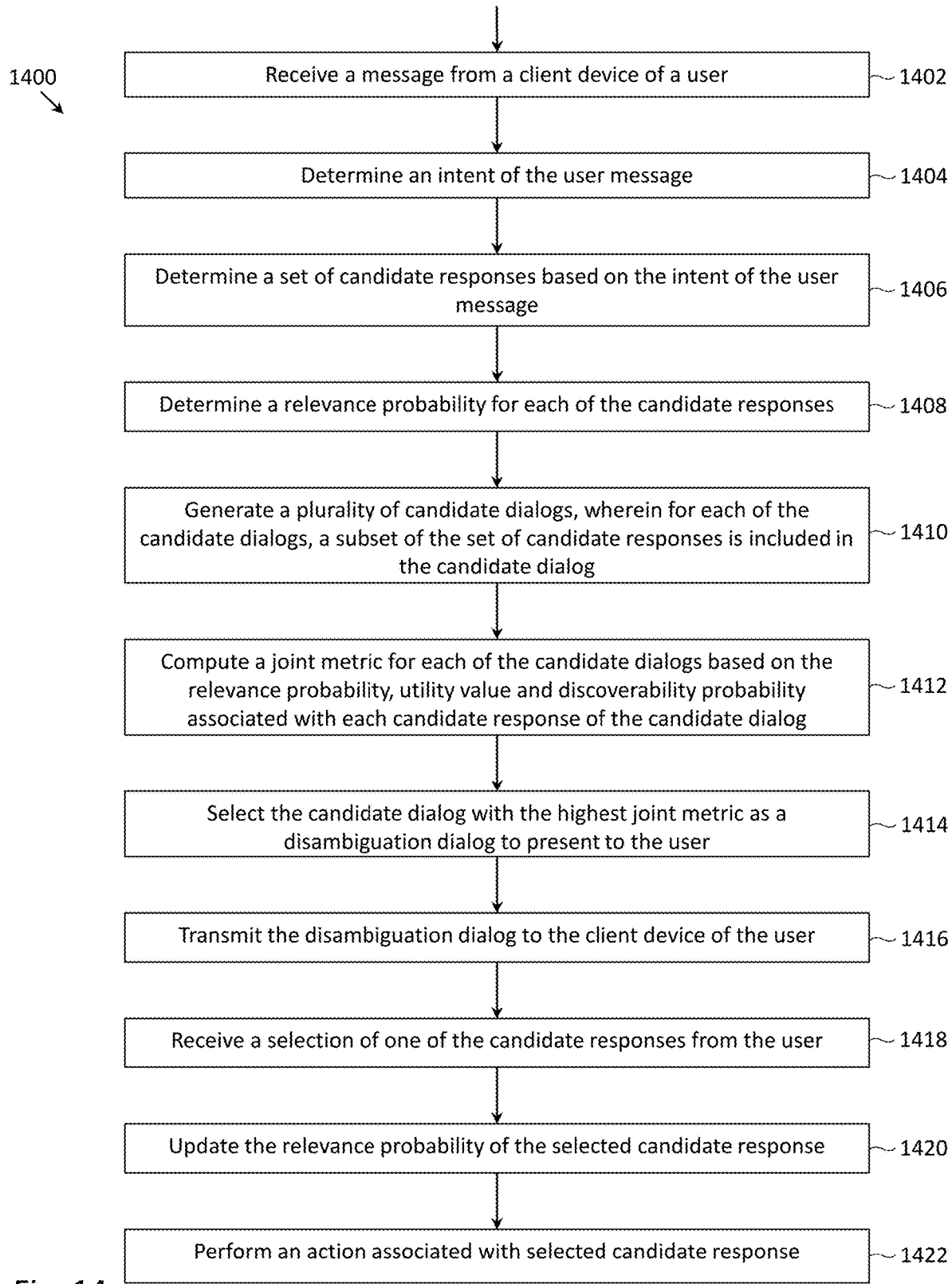
FIG. 14 depicts a flow diagram of a process performed by the automated agent in the conversation depicted in FIG. 11A, in accordance with one embodiment of the invention.

FIG. 14 depicts flow diagram 1400 of a process performed by the automated agent in the conversation described in FIG. 11A. At step 1402, automated agent 105 may receive message 108 from client device 102 of user 106. In the conversation of FIG. 11A, message 108 stated "I'm having some problems with the printer". At step 1404, NLU module 112 of the automated agent 105 may determine intent 113 of message 108. In the conversation of FIG. 11A, the intent of message 108 was determined to be "user needs help addressing an issue with the printer". At step 1406, candidate response generator 114 of automated agent 105 may determine a set of candidate responses 115 based on intent 113 of user message 108. In the example of FIG. 5, candidate responses R1-R7 were determined in response to intent 113.

Additional details for the determination of candidate responses will be provided below in association with FIG. 15.

At step 1408, relevance probability generator 302 of disambiguation dialog generator 116 may determine a relevance probability for each of the candidate responses based on one or more of intent 113, historical data 122, conversation history 120 and user profile 124. Examples of relevance probabilities were provided in FIG. 7. As discussed above, the relevance probabilities of the set of candidate responses 115 may form a probability distribution.

At step 1410, candidate dialog generator of disambiguation dialog generator 116 may form a plurality of candidate dialogs. For each of the candidate dialogs, a subset of the set of candidate responses 115 may be included in the candidate dialog. In addition, for each candidate response within the subset, the candidate response (i) may be presented in the candidate dialog in accordance with a presentation format, and (ii) may be associated with a discoverability probability. Examples of candidate dialogs were presented in FIGS. 9A-9C. Additional details regarding step 1410 will be provided below in association with FIG. 16.

At step 1412, joint metric module 318 of disambiguation dialog generator 116 may compute a joint metric for the candidate dialog based on a function of the relevance probability, the utility value, and the discoverability probability associated with each of the one or more candidate responses included within the candidate dialog. The function may include computing a sum of the products of the relevance probability, the utility value, and the discoverability probability associated with each of the one or more candidate responses included within the candidate dialog. Examples of joint metrics were provided in FIGS. 9A-9C. At step 1414, disambiguation dialog selector 322 of disambiguation dialog generator 116 may select the candidate dialog with the highest joint metric as the disambiguation dialog to present to the user. In the example of FIGS. 9A-9C, candidate dialog 21 had the highest joint metric and was selected as the disambiguation dialog to present to the user. At step 1416, disambiguation dialog 126 may be transmitted to client device 102 of the user, and be presented to the user via client device 102 (as in FIG. 11A).

At step 1418, decision module 130 of automated agent 105 may receive the user's selection of one of the candidate responses presented in disambiguation dialog 126. In the conversation of FIG. 11A, the user's selection was option 2 (corresponding to candidate response R3) of the disambiguation dialog. At step 1420, automated agent 105 may update the relevance probability of the selected candidate response. In the example of FIG. 11B, the relevance probability of candidate response R3 was increased in light of the user's selection of candidate response $3. At step 1422, action execution module 136 of automated agent 105 may perform an action associated with the selected candidate response. In the conversation of FIG. 11A, action execution module 136 scheduled a technician (at a particular day/time) to perform the maintenance of the printer.

Figure 15:
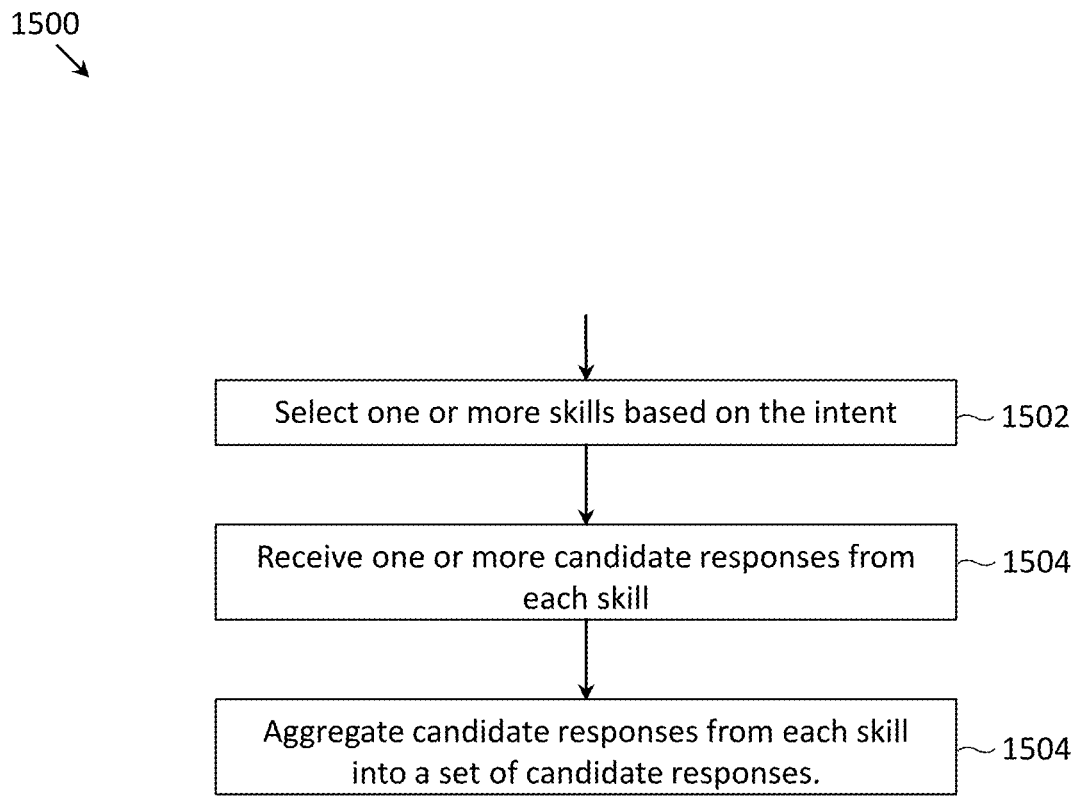
FIG. 15 depicts a flow diagram of a process performed by the automated agent to determine a set of candidate responses in response to an intent, in accordance with one embodiment of the invention.

FIG. 15 depicts flow diagram 1500 of a process performed by automated agent 105 to determine a set of candidate responses in response to the intent. At step 1502, skill selector 202 of candidate response generator 104 may select one or more skills based on intent 113. In the example of FIG. 5, skill selector 202 selected the search skill, the form filling skill, the help desk skill and the customer support skill. At step 1504, response aggregator 208 of candidate response generator 104 may receive one or more candidate responses from each of the selected skills. In the example of FIG. 5, response aggregator 208 received candidate response R1 from the search skill, candidate responses R2-R5 from the form filling skill, candidate response R6 from the help desk skill, and candidate response R7 from the customer support skill. At step 1504, response aggregator 208 may also receive a utility value associated with each of the candidate responses from the selected skill, as depicted in FIG. 5. At step 1504, response aggregator 208 may aggregate the candidate responses from each skill into a set of candidate responses 115.

Figure 16:
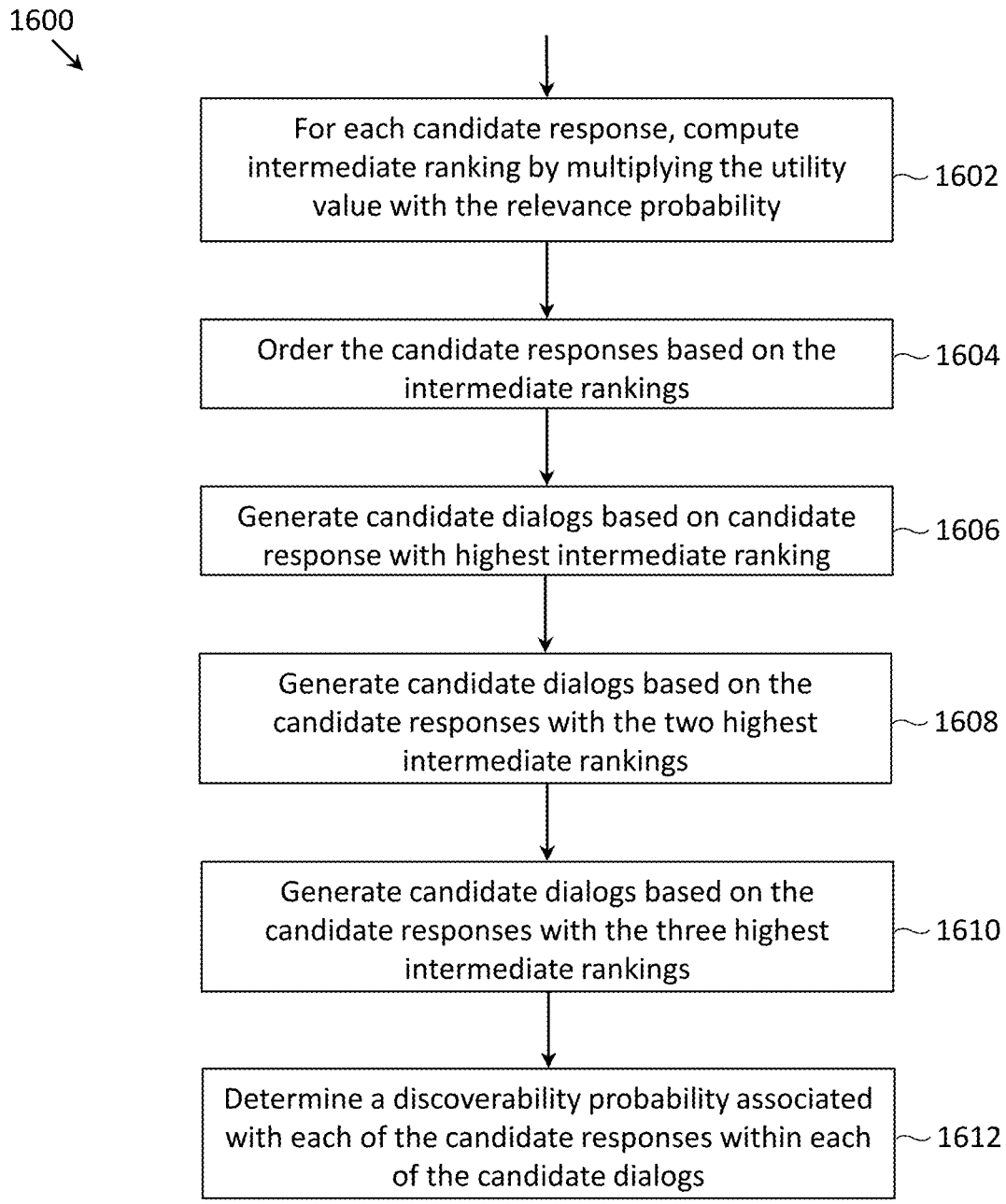
FIG. 16 depicts a flow diagram of a process performed by the automated agent to construct a set of candidate dialogs from a set of candidate responses, in accordance with one embodiment of the invention.

FIG. 16 depicts flow diagram 1600 of a process performed by automated agent 105 to determine a set of candidate dialogs based on the set of candidate responses. At step 1602, ranking module 306 of disambiguation dialog generator 116 may compute an intermediate ranking for each of the candidate responses by multiplying its associated utility value with its associated relevance probability. Examples of intermediate rankings were provided in FIG. 8. At step 1604, ranking module 306 may also order the candidate responses from highest intermediate ranking to lowest intermediate ranking. An ordered version of the candidate responses is also depicted in FIG. 8.

At step 1606, candidate dialog generator 310 may generate one or more candidate dialogs based only on the candidate response with the highest intermediate ranking by varying the presentation format associated with the candidate response. Candidate dialogs 1-3 depicted in FIG. 9A were examples of candidate dialogs generated in such a fashion. At step 1608, candidate dialog generator 310 may generate one or more candidate dialogs based only on the candidate responses with the two highest intermediate rankings by enumerating the presentation formats across the two candidate responses. Candidate dialogs 4-12 depicted in FIG. 9A were examples of candidate dialogs generated in such a fashion. At step 1610, candidate dialog generator 310 may generate one or more candidate dialogs based only on the candidate responses with the three highest intermediate rankings by enumerating the presentation formats across the three candidate responses. Candidate dialogs 13-39 depicted in FIGS. 9A-9C were examples of candidate dialogs generated in such a fashion.

At step 1612, discoverability probability generator 314 may generate a discoverability probability for each of the candidate responses of the candidate dialogs. Examples of discoverability probabilities were provided in FIGS. 9A-9C.

Figure 17:
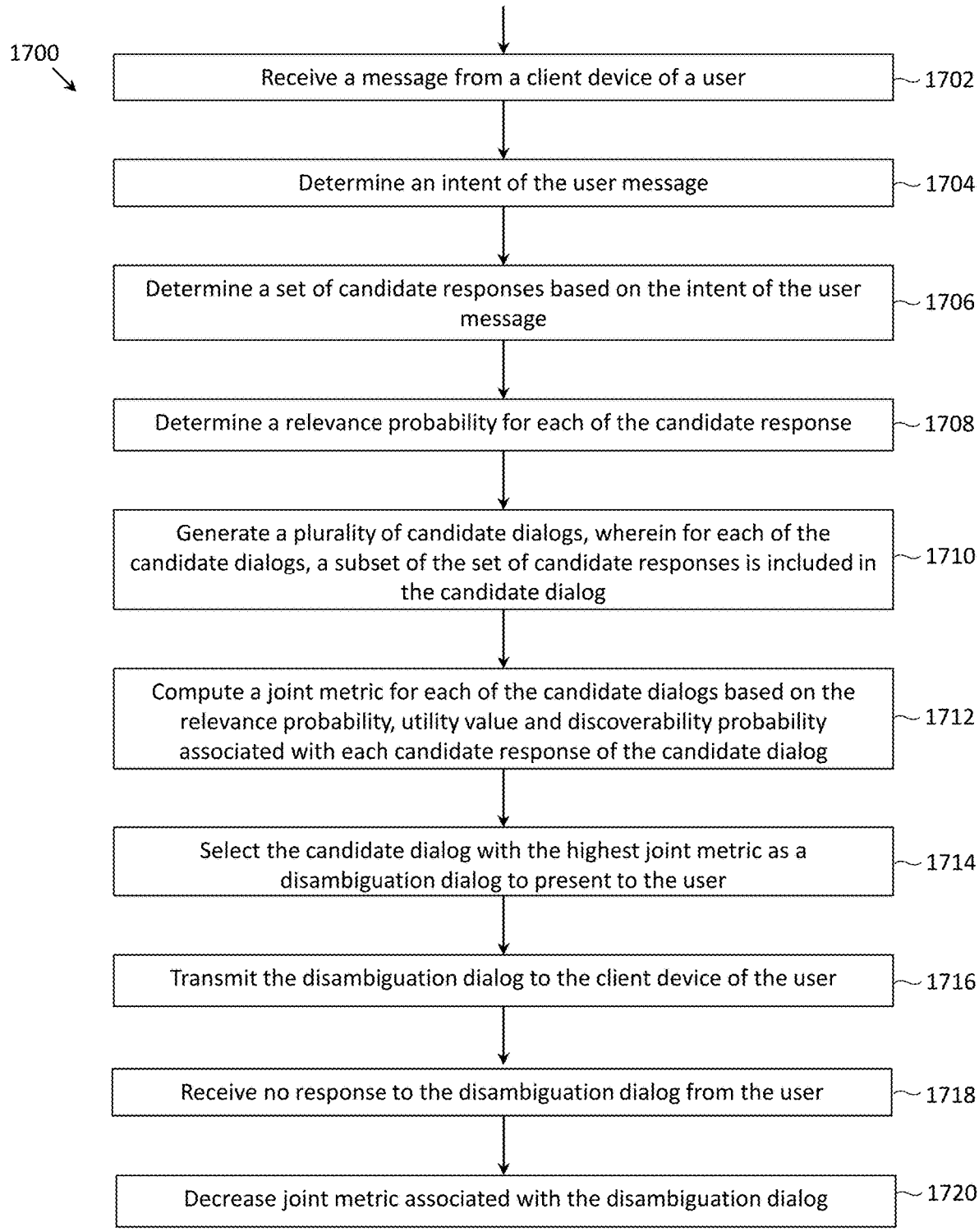
FIG. 17 depicts a flow diagram of a process performed by the automated agent in the conversation depicted in FIG. 12A, in accordance with one embodiment of the invention.

FIG. 17 depicts flow diagram 1700 of a process performed by automated agent 105 in the conversation described in FIG. 12A. Steps 1702, 1704, 1706, 1708, 1710, 1712, 1714 and 1716 are similar to steps 1402, 1404, 1406, 1408, 1410, 1412, 1414 and 1416 of FIG. 14, and for conciseness, the description thereof will not be repeated. At step 1718, no response to the disambiguation dialog may be received from the user, also known as a "drop off" event. At step 1720, automated agent 105 may decrease the joint metric associated with the disambiguation dialog. An example of updating of the joint metric associated with the disambiguation dialog was provided in FIG. 12C in which the joint metric was updated from 0.1548 to 0.1368.

Figure 18:
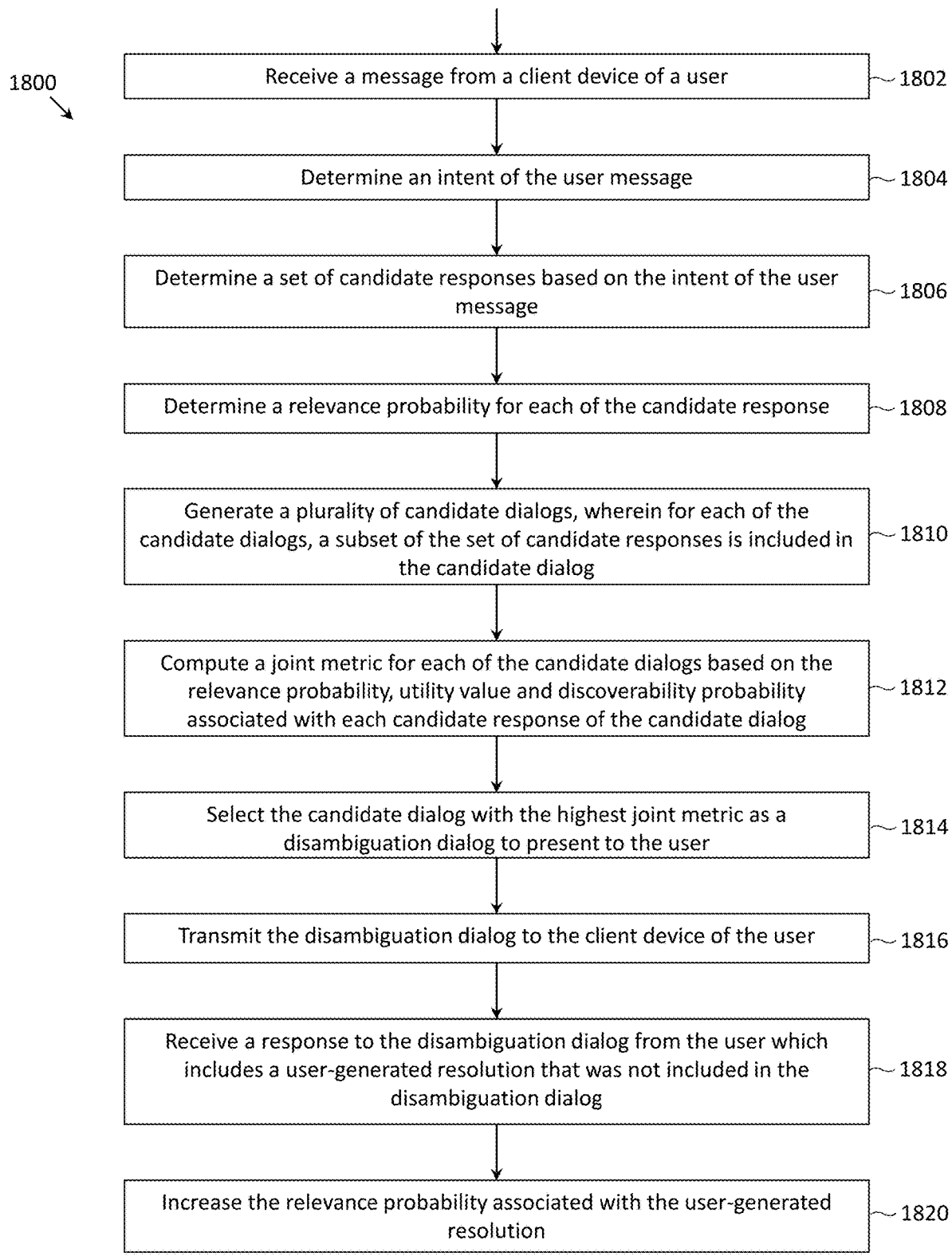
FIG. 18 depicts a flow diagram of a process performed by the automated agent in the conversation depicted in FIG. 13A, in accordance with one embodiment of the invention.

FIG. 18 depicts flow diagram 1800 of a process performed by automated agent 105 in the conversation described in FIG. 13A. Steps 1802, 1804, 1806, 1808, 1810, 1812, 1814 and 1816 are similar to steps 1402, 1404, 1406, 1408, 1410, 1412, 1414 and 1416 of FIG. 14, and for conciseness, the description thereof will not be repeated. At step 1818, automated agent 105 may receive a response to the disambiguation dialog from the user which includes a user-generated resolution that was not included in the disambiguation dialog. In the example conversation of FIG. 13A, message 128 included a user-generated resolution (e.g., order paper) that was not included in the disambiguation dialog. At step 1820, automated agent 105 may increase the relevance probability associated with the user-generated resolution. An example of such updating of the relevance probability was provided in FIG. 13B, in which the relevance probability of candidate response R4 was updated from 0.050 to 0.056.

Figure 19:
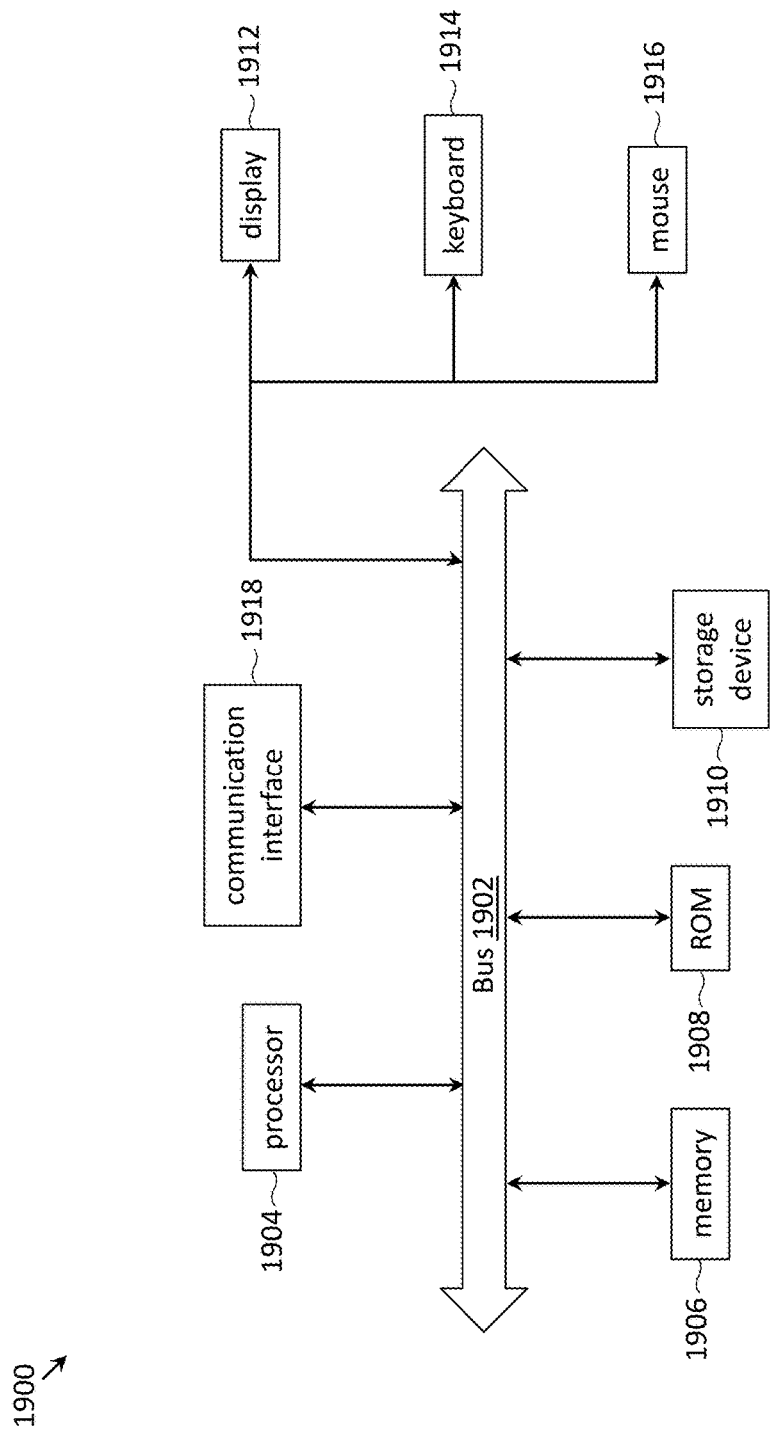
FIG. 19 depicts components of a computer system in which computer readable instructions instantiating the methods of the present invention may be stored and executed.

As is apparent from the foregoing discussion, aspects of the present invention involve the use of various computer systems and computer readable storage media having computer-readable instructions stored thereon. FIG. 19 provides an example of a system 1900 that may be representative of any of the computing systems (e.g., client device 102, server 104) discussed herein. Examples of system 1900 may include a smartphone, a desktop, a laptop, a mainframe computer, an embedded system, etc. Note, not all of the various computer systems have all of the features of system 1900. For example, certain ones of the computer systems discussed above may not include a display inasmuch as the display function may be provided by a client computer communicatively coupled to the computer system or a display function may be unnecessary. Such details are not critical to the present invention.

System 1900 includes a bus 1902 or other communication mechanism for communicating information, and a processor 1904 coupled with the bus 1902 for processing information. Computer system 1900 also includes a main memory 1906, such as a random access memory (RAM) or other dynamic storage device, coupled to the bus 1902 for storing information and instructions to be executed by processor 1904. Main memory 1906 also may be used for storing temporary variables or other intermediate information during execution of instructions to be executed by processor 1904. Computer system 1900 further includes a read only memory (ROM) 1908 or other static storage device coupled to the bus 1902 for storing static information and instructions for the processor 1904. A storage device 1910, for example a hard disk, flash memory-based storage medium, or other storage medium from which processor 1904 can read, is provided and coupled to the bus 1902 for storing information and instructions (e.g., operating systems, applications programs and the like).

Computer system 1900 may be coupled via the bus 1902 to a display 1912, such as a flat panel display, for displaying information to a computer user. An input device 1914, such as a keyboard including alphanumeric and other keys, may be coupled to the bus 1902 for communicating information and command selections to the processor 1904. Another type of user input device is cursor control device 1916, such as a mouse, a trackpad, or similar input device for communicating direction information and command selections to processor 1904 and for controlling cursor movement on the display 1912. Other user interface devices, such as microphones, speakers, etc. are not shown in detail but may be involved with the receipt of user input and/or presentation of output.

The processes referred to herein may be implemented by processor 1904 executing appropriate sequences of computer-readable instructions contained in main memory 1906. Such instructions may be read into main memory 1906 from another computer-readable medium, such as storage device 1910, and execution of the sequences of instructions contained in the main memory 1906 causes the processor 1904 to perform the associated actions. In alternative embodiments, hard-wired circuitry or firmware-controlled processing units may be used in place of or in combination with processor 1904 and its associated computer software instructions to implement the invention. The computer-readable instructions may be rendered in any computer language.

In general, all of the above process descriptions are meant to encompass any series of logical steps performed in a sequence to accomplish a given purpose, which is the hallmark of any computer-executable application. Unless specifically stated otherwise, it should be appreciated that throughout the description of the present invention, use of terms such as "processing", "computing", "calculating", "determining", "displaying", "receiving", "transmitting" or the like, refer to the action and processes of an appropriately programmed computer system, such as computer system 1900 or similar electronic computing device, that manipulates and transforms data represented as physical (electronic) quantities within its registers and memories into other data similarly represented as physical quantities within its memories or registers or other such information storage, transmission or display devices.

Computer system 1900 also includes a communication interface 1918 coupled to the bus 1902. Communication interface 1918 may provide a two-way data communication channel with a computer network, which provides connectivity to and among the various computer systems discussed above. For example, communication interface 1918 may be a local area network (LAN) card to provide a data communication connection to a compatible LAN, which itself is communicatively coupled to the Internet through one or more Internet service provider networks. The precise details of such communication paths are not critical to the present invention. What is important is that computer system 1900 can send and receive messages and data through the communication interface 1918 and in that way communicate with hosts accessible via the Internet. It is noted that the components of system 1900 may be located in a single device or located in a plurality of physically and/or geographically distributed devices.

Thus, the generation of a disambiguation dialog in response to a message from a user has been described. It is to be understood that the above-description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A method, comprising:
   instantiating an automated agent on a computing device;
   receiving, by the automated agent, a first message from a client device of a user;
   determining, by the automated agent, an intent of the first message;
   determining, by the automated agent, a set of candidate responses based on the intent of the first message, wherein each of the candidate responses from the set is associated with a utility value, the utility value specifying a utility of the candidate response to the user;
   for each of the candidate responses from the set, determining, by the automated agent, a relevance probability of the candidate response, wherein the relevance probability is a probability that the candidate response is relevant to the user's needs as specified in the first message;
   generating, by the automated agent, a plurality of candidate dialogs, wherein for each of the candidate dialogs, a subset of the set of candidate responses is included in the candidate dialog, and for each candidate response within the subset, the candidate response (i) is presented in the candidate dialog in accordance with a presentation format, and (ii) is associated with a discoverability probability;

for each of the candidate dialogs, computing, by the automated agent, a joint metric for the candidate dialog based on a function of the relevance probability, the utility value, and the discoverability probability associated with each of the one or more candidate responses included within the candidate dialog;

selecting, by the automated agent, the candidate dialog from the plurality of candidate dialogs with the highest joint metric as a disambiguation dialog to present to the user; and transmitting, by the computing device, the disambiguation dialog to the client device of the user.

2. The method of claim 1, wherein determining the set of candidate responses based on the intent comprises:

selecting a plurality of skills based on the intent;
receiving one or more candidate responses from each of the selected skills; and
aggregating the one or more candidate responses from each of the selected skills into the set of candidate responses.

3. The method of claim 2, wherein the utility value associated with each of the candidate responses is received from the selected skills.

4. The method of claim 1, wherein the utility value of the candidate response is determined by evaluating business logic.

5. The method of claim 1, wherein the utility value of the candidate response is based on a type of resolution offered by the candidate response, and wherein the type of resolution includes at least one of an instructive message that educates the user on how to resolve an issue specified in the first message, or an action that is performed by the automated agent or a human to resolve the issue specified in the first message.

6. The method of claim 1, wherein the utility value of the candidate response is based on whether an action specified in the candidate response can be carried out immediately after receipt of the first message.

7. The method of claim 1, wherein the relevance probability of the candidate response is based on at least one of a user profile and a conversation history of the user.

8. The method of claim 1, wherein the relevance probability of the candidate response is based on a conversation history of the user, and the conversation history includes a second message of the user that is received prior to the first message.

9. The method of claim 1, wherein the relevance probability of the candidate response is based on a conversation history of the user, and the conversation history includes a selection from the user that is responsive to a disambiguation dialog presented prior to receiving the first message.

10. The method of claim 1, wherein the relevance probabilities from the set of candidate responses form a probability distribution.

11. The method of claim 1, wherein the presentation format is one of a long, medium and short presentation format, and for one of the candidate responses embodied as an article, the long presentation format of the article includes an entirety of the article, the medium presentation format of the article includes a snippet of the article, and the short presentation format of the article includes a link to the article.

12. The method of claim 1, wherein for one of the candidate dialogs, and for one of the one or more candidate responses included in the candidate dialog, the discoverability probability of the candidate response is based on at least one of the presentation format of the candidate response, a vertical dimension of a screen area of the candidate dialog, a total number of candidate responses included in the candidate dialog, a fraction of a screen area of the candidate dialog that is occupied by the candidate response, or a prominence of a manner in which the candidate response is presented within the candidate dialog.

13. The method of claim 1, wherein for one of the candidate dialogs, and for one of the one or more candidate responses included in the candidate dialog, the discoverability probability of the candidate response is computed as a probability that the user will select the candidate response when presented with the candidate dialog, conditioned upon the candidate response being relevant and having utility, a complexity of an entirety of the candidate dialog, a prominence of a manner in which the candidate response is presented within the candidate dialog, and a clarity in which a content of the candidate response is expressed.

14. The method of claim 1, further comprising:
in response to receiving, from the user, a selection of a first candidate response included in the disambiguation dialog, increasing the relevance probability of the first candidate response.

15. The method of claim 1, further comprising:
in response to receiving, from the user, a selection of a first candidate response included in the disambiguation dialog, performing an action specified by the first candidate response that fulfills a request specified in the first message.

16. The method of claim 1, further comprising:
in response to receiving no response to the disambiguation dialog from the user, decreasing the joint metric associated with the candidate dialog that was selected as the disambiguation dialog.

17. The method of claim 1, further comprising:
receiving a response to the disambiguation dialog from the user which includes a user-generated resolution that was not included in the disambiguation dialog;
determining whether the user-generated resolution is included in the set of candidate responses; and
if the user-generated resolution is included in the set of candidate responses, increasing a relevance probability associated with the user-generated resolution.

18. The method of claim 1, wherein for one of the candidate dialogs that includes a first candidate response, the computation of the joint metric of the candidate dialog comprises computing a product of the relevance probability, the utility value, and the discoverability probability of the first candidate response.

19. The method of claim 1, wherein for one of the candidate dialogs that includes a first candidate response and a second candidate response, the computation of the joint metric of the candidate dialog comprises:

computing a first product of the relevance probability, the utility value, and the discoverability probability of the first candidate response;
computing a second product of the relevance probability, the utility value, and the discoverability probability of the second candidate response; and
computing a sum of the first and second product.

20. A non-transitory machine-readable storage medium comprising instructions that, when executed by a processor, cause the processor to:
- receive a first message from a client device of a user;
- determine an intent of the first message;
- determine a set of candidate responses based on the intent of the first message, wherein each of the candidate responses from the set is associated with a utility value, the utility value specifying a utility of the candidate response to the user;
- for each of the candidate responses from the set, determine a relevance probability of the candidate response, wherein the relevance probability is a probability that the candidate response is relevant to the user's needs as specified in the first message;
- generate a plurality of candidate dialogs, wherein for each of the candidate dialogs, a subset of the set of candidate responses is included in the candidate dialog, and for each candidate response within the subset, the candidate response (i) is presented in the candidate dialog in accordance with a presentation format, and (ii) is associated with a discoverability probability;
- for each of the candidate dialogs, compute a joint metric for the candidate dialog based on a function of the relevance probability, the utility value, and the discoverability probability associated with each of the one or more candidate responses included within the candidate dialog;
- select the candidate dialog from the plurality of candidate dialogs with the highest joint metric as a disambiguation dialog to present to the user; and
- transmit the disambiguation dialog to the client device of the user.

* * * * *